(12) United States Patent
Lee et al.

(10) Patent No.: US 7,388,854 B2
(45) Date of Patent: Jun. 17, 2008

(54) SYSTEM FOR INTERCONNECTING WIRED AND WIRELESS PHONE SERVICES AND METHOD FOR PROCESSING CALL

(75) Inventors: Soon-Phil Lee, Suwon-si (KR); Gui-Jung Lee, Yongin-si (KR); Dong-Youl Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 779 days.

(21) Appl. No.: 10/775,256

(22) Filed: Feb. 11, 2004

(65) Prior Publication Data

US 2004/0160931 A1    Aug. 19, 2004

(30) Foreign Application Priority Data

Feb. 12, 2003  (KR) ...................... 10-2003-0008933
Feb. 12, 2003  (KR) ...................... 10-2003-0008935
Feb. 12, 2003  (KR) ...................... 10-2003-0008936

(51) Int. Cl.
  *H04Q 7/24* (2006.01)
(52) U.S. Cl. .................. 370/338; 455/426.1; 455/462; 455/554.1; 455/555
(58) Field of Classification Search ................ 370/310, 370/328, 331, 338, 401; 455/426.1, 436, 455/462, 465, 445, 435.1, 554.1, 555
See application file for complete search history.

(56) References Cited

U.S. PATENT DOCUMENTS 5,722,076 A    2/1998  Sakabe et al.

(Continued)

FOREIGN PATENT DOCUMENTS

CN    1191459    8/1998

(Continued)

OTHER PUBLICATIONS

Chinese Office Action for Chinese Patent Application No. 200410039764.8 issued on Nov. 10, 2006.

(Continued)

*Primary Examiner*—Nguyen Vo
(74) *Attorney, Agent, or Firm*—Robert E. Bushnell, Esq.

(57) ABSTRACT

A system for interconnecting wired and wireless phone services in accordance with the present invention includes at least one of first wired terminals; public/private mobile communication terminals which are registered in public and private mobile communication networks; a private base station which constructs a wireless communication path with an arbitrary mobile communication terminal in its service area and manages wireless resources for the mobile communication; and a wired and wireless interconnecting apparatus which is connected to a public phone network and the private base station, constructs an internal network formed of the first wired terminals and the public/private mobile communication terminals to endow each of the terminals with a wired phone number, makes a call to a wired terminal in the case that there is a call to an arbitrary first wired terminal, and performs a switching function to simultaneously make a call to the public/private mobile communication terminal assigned to the first wired terminal. Therefore, a general wired subscriber is provided with the wired phone service and a service of portability through a wireless terminal, and the subscriber's accounting burden can be reduced.

15 Claims, 27 Drawing Sheets

U.S. PATENT DOCUMENTS

| | | | |
|---|---|---|---|
| 5,724,658 A | 3/1998 | Hasan | |
| 5,748,619 A | 5/1998 | Meier | |
| 5,963,864 A * | 10/1999 | O'Neil et al. | 455/445 |
| 5,991,639 A | 11/1999 | Rautiola et al. | |
| 6,223,055 B1 * | 4/2001 | Cyr | 455/555 |
| 6,226,528 B1 | 5/2001 | son .ANG.kerberg et al. | |
| 6,337,857 B1 * | 1/2002 | Booton | 370/352 |
| 6,405,041 B1 * | 6/2002 | Mukerjee et al. | 455/445 |
| 6,549,786 B2 | 4/2003 | Cheung et al. | |
| 6,658,259 B2 * | 12/2003 | McIntosh | 455/462 |
| 6,665,536 B1 | 12/2003 | Mahany | |
| 6,681,252 B1 | 1/2004 | Schuster et al. | |
| 6,985,723 B2 * | 1/2006 | Kil | 455/426.1 |
| 2002/0002627 A1 | 1/2002 | Stead et al. | |
| 2002/0019246 A1 * | 2/2002 | Forte | 455/555 |
| 2002/0168968 A1 * | 11/2002 | Glass | 455/415 |
| 2003/0048794 A1 | 3/2003 | Sato et al. | |
| 2003/0140146 A1 | 7/2003 | Akers et al. | |
| 2004/0110465 A1 * | 6/2004 | Bedingfield et al. | 455/3.05 |
| 2004/0160968 A1 * | 8/2004 | Ko et al. | 370/401 |
| 2004/0198355 A1 * | 10/2004 | Kim et al. | 455/435.1 |

FOREIGN PATENT DOCUMENTS

| | | |
|---|---|---|
| JP | 08-265812 | 10/1996 |
| JP | 09-037314 | 2/1997 |
| JP | 09-084091 | 3/1997 |

OTHER PUBLICATIONS

Office action from the Japanese Patent Office issued in Applicant's corresponding Japanese Patent Application No. 2004-035831 dated Jun. 27, 2006.

* cited by examiner

SYSTEM FOR INTERCONNECTING WIRED AND WIRELESS PHONE SERVICES AND METHOD FOR PROCESSING CALL

CROSS REFERENCE TO RELATED APPLICATION

This application relates to two U.S. patent applications, entitled METHOD FOR INTERCONNECTING OF SYSTEM FOR INTERCONNECTING WIRED AND WIRELESS PHONE SERVICES, and entitled METHOD FOR OPERATING WIRED AND WIRELESS PHONE SERVICES INTERCONNECTIVELY, which are concurrently being submitted with this application to the U.S. Patent & Trademark Office, and which are based on Korean patent applications entitled SYSTEM FOR INTERCONNECTING WIRED AND WIRELESS PHONE SERVICES AND METHOD FOR PROCESSING CALL earlier filed in the Korean Intellectual Property Office on 12 Feb. 2003 and there duly assigned Serial No. 2003-8933, entitled METHOD FOR INTERCONNECTING OF SYSTEM FOR INTERCONNECTING WIRED AND WIRELESS PHONE SERVICES earlier filed in the Korean Intellectual Property Office on 12 Feb. 2003 and there duly assigned Serial No. 2003-8935, and entitled METHOD FOR OPERATING WIRED AND WIRELESS PHONE SERVICES INTERCONNECTIVELY earlier filed in the Korean Intellectual Property Office on 12 Feb. 2003 and there duly assigned Serial No. 2003-8936. Each of the above-cited applications is incorporated herein by reference in its entirety.

CLAIM OF PRIORITY

This application makes reference to, incorporates the same herein, and claims all benefits accruing under 35 U.S.C. § 119 from applications for SYSTEM FOR INTERCONNECTING WIRED AND WIRELESS PHONE SERVICES AND METHOD FOR PROCESSING CALL earlier filed in the Korean Intellectual Property Office on 12 Feb. 2003 and there duly assigned Serial No. 2003-8933, for METHOD FOR INTERCONNECTING OF SYSTEM FOR INTERCONNECTING WIRED AND WIRELESS PHONE SERVICES earlier filed in the Korean Intellectual Property Office on 12 Feb. 2003 and there duly assigned Serial No. 2003-8935, and for METHOD FOR OPERATING WIRED AND WIRELESS PHONE SERVICES INTERCONNECTIVELY earlier filed in the Korean Intellectual Property Office on 12 Feb. 2003 and there duly assigned Serial No. 2003-8936.

BACKGROUND OF THE INVENTION

1. Field of the Invention

The present invention relates to a system for interconnecting services of wired and wireless phones, and more particularly, to a system for interconnecting services of wired and wireless phones wherein a subscriber using a wired phone service is provided with portability and a method for processing a call.

2. Description of the Related Art

Generally, a conventional public communication network can be divided into a wired phone service network and a mobile communication phone service network. The wired phone service is provided with the aid of a public switched telephone network (PSTN), and a wired phone terminal is connected to a telephone station using a telephone line. In the case of the wired phone service as described above, portability cannot be provided since the wired phone terminal is connected to the telephone station using the telephone line. Of course, even though a wireless phone performing a wireless communication with a main body of the wired phone terminal using a 900 MHz (megahertz) wireless bandwidth is being used, there is a problem that its portability is largely limited compared with the mobile communication terminal using the mobile communication service.

On the other hand, the mobile communication service is provided with the mobility using a Public Land Mobile Network (referred to as 'PLMN', hereinafter). The PLMN includes a Mobile Switching Center (referred to as 'MSC', hereinafter) which takes charge of a mobile communication service in an arbitrary area, a Base Station Controller (referred to as 'BSC', hereinafter), a Base station Transceiver Subsystem (referred to as 'BTS', hereinafter), and a HLR/VLR (Home Location Register/Visitor Location Register). The CDMA (Code Division Multiple Access) collectively indicates wireless environments which take charge of mobile communication services in another district.

The MSC performs connection and control of a plurality of BSCs connected to the MSC to other MSCs in the PSTN or PLMN.

The BSC performs functions of wireless link control and handoff, and the BTS performs functions of constructing a wireless communication path together with its communication service area, that is, a wireless terminal included in its cell area and managing a wireless resource.

In the HLR/VLR, the HLR performs functions of subscriber location registration and a database for storing subscriber information, and the VLR is a database which temporarily stores information of an MS existing in a cell area of which a corresponding MSC among a plurality of MSCs takes charge. When the MS moves to a cell area where other MSCs manage, information stored in the corresponding VLR is removed.

Even in the case of the mobile communication phone service using the PLMN, it does not interconnectively operate with a wired phone terminal using the public switching telephone network so that there occurs a problem that each service operates independently and does not have interrelationship.

On the other hand, even though the mobile communication service can be generally serviced everywhere without being restricted to an area such as premises, that service can be provided by only using the mobile communication service system and a wireless communication cannot be provided without special billing in an established area.

That is, in order that a wired phone service terminal using a wired phone service communicates with a mobile communication terminal of the mobile communication service subscriber, a method was used, where each terminal is connected to the PSTN through each exchange and connects a call to the other terminal.

Here, the PSTN includes the PLMN and PSTN. Accordingly, there was an inconvenience that an accounting was charged even when a wired communication subscriber and a mobile communication service subscriber were communicating in the same building or apartment complex.

Furthermore, in the case that a subscriber is simultaneously provided with wired phone and mobile communication services, there was a problem that the communication service fare was burdensome since the subscriber has to pay for in each of communication fares.

Furthermore, in the case that a subscriber is simultaneously provided with wired phone and mobile communication services, and other party knows one number of the two phone numbers and makes a call to the corresponding terminal, there was an inconvenience that a communication connection could not be achieved when the subscriber could not respond to the call with the corresponding terminal even though the subscriber had another terminal.

Of course, when a call for an arbitrary terminal is made, the call can be transferred to another terminal using a call terminating service. However, there was a problem that the service can be provided when it has been previously established, and only the terminal to which the call terminating service has been assigned is called when the service has been assigned.

SUMMARY OF THE INVENTION

It is, therefore, an object of the present invention to provide a system for interconnecting services of wired and wireless phones wherein a wired phone service subscriber is provided with portability.

It is another object of the present invention to provide a system for interconnecting services of wired and wireless phones wherein a fare burden can be reduced due to a dual accounting when a subscriber simultaneously uses wired phone and mobile communication services.

It is yet another object of the present invention to provide a system for interconnecting services of wired and wireless phones wherein, when a subscriber simultaneously uses wired phone and mobile communication services and other party makes a call to one of the two phones, the subscriber can respond to the call with both terminals.

It is another object of the present invention to provide a system for interconnecting services of wired and wireless phones having, in the case that a subscriber is subscribed in a wired phone service using a wired and wireless interconnecting apparatus, portability in the wired phone service, when the wired phone terminal is called, the call can be simultaneously terminated in a private mobile communication network operated by a wired and wireless interconnecting apparatus through an existing wired phone service and an assigned wireless terminal.

It is still another object of the present invention to provide, as a virtual wired phone number in a form of a general wired phone service phone number is operated, the possibility to receive a telephone called by an external subscriber using a wired phone number through a user's wireless terminal, and as a caller ID is transmitted as a virtual wired phone number when the external subscriber is called, an effect can be obtained that the user has a wired phone terminal in view of the external subscriber on the state that the wired phone terminal is not installed, and, when the external subscriber makes a call to a subscriber's wireless terminal, the phone service can be provided according to an accounting rate of the wired phone service.

It is another object of the present invention to provide an apparatus, even when a subscriber simultaneously uses the wired phone and wireless phone services, an internal subscriber may not be charged so that a burden due to a dual charge can be reduced.

According to an aspect of the present invention, there is provided a system for interconnecting wired and wireless phone services, including: at least one of first wired terminals; public/private mobile communication terminals which are registered in public and private mobile communication networks; a private base station which constructs a wireless communication path with an arbitrary mobile communication terminal in its service area and manages wireless resources for the mobile communication; and a wired and wireless interconnecting apparatus which is connected to a public phone network and the private base station, constructs an internal network formed of the first wired terminals and the public/private mobile communication terminals to endow each of the terminals with a wired phone number, makes a call to a wired terminal in the case that there is a call to an arbitrary first wired terminal, and performs a switching function to simultaneously make a call to the public/private mobile communication terminal assigned to the first wired terminal.

According to another aspect of the present invention, there is provided a technique for processing a call in a system for interconnecting wired and wireless phone services including at least one of first wired terminals, public/private mobile communication terminals registered in public and private mobile communication networks, a private base station to perform a wireless communication with the public/private mobile communication terminals, a wired and wireless interconnecting apparatus to perform an interconnection between the first wired terminals and the public/private mobile communication terminal through the private base station, the method including the steps of: enabling the wired and wireless interconnecting apparatus to make a call to the wired terminal when an arbitrary first wired terminal is called, and to be switched in order to make a call to the public/private mobile communication terminals assigned to the wired terminals simultaneously; enabling the private base station to be broadcasted in its wireless area in order to make a call to the corresponding public/private mobile communication terminals according to the switching of the wired and wireless interconnecting apparatus; and enabling the wired and wireless interconnecting apparatus to make a call to a responding terminal among the called first wired terminal or the public/private mobile communication terminals and to stop the call made to the terminal which does not make a response.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
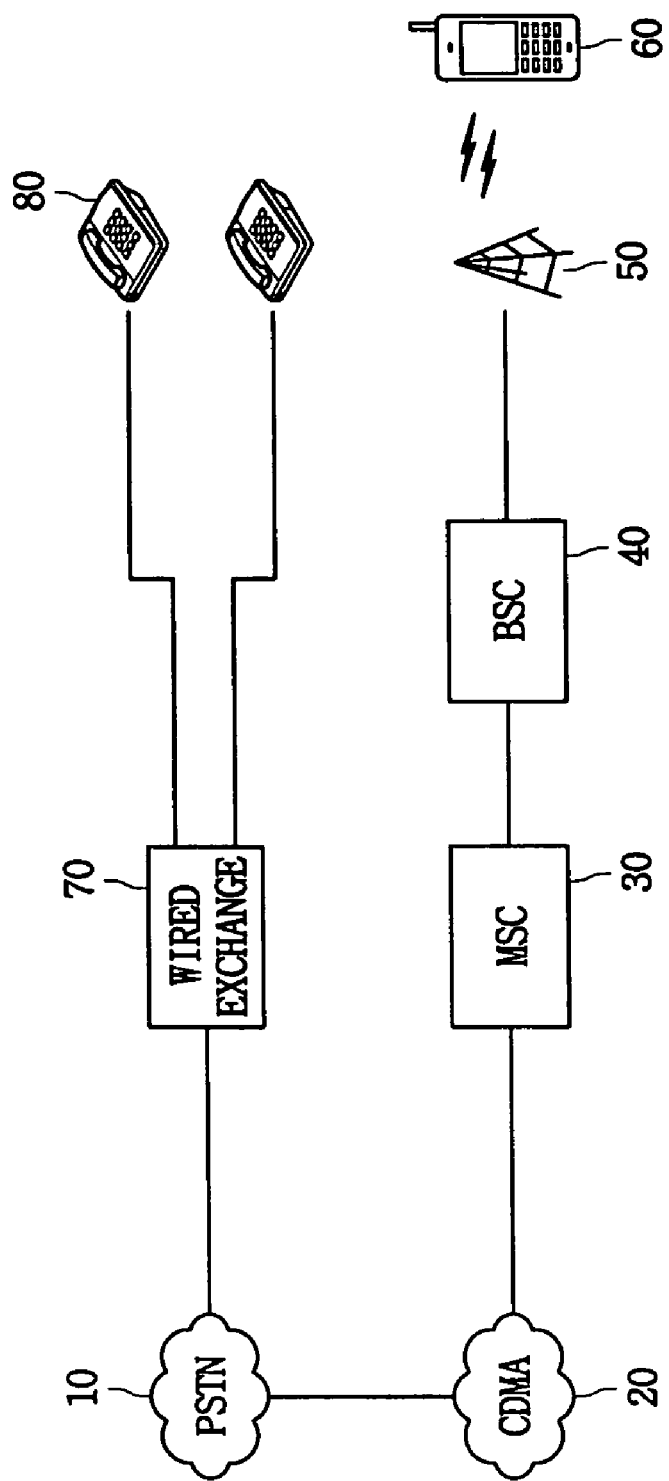
FIG. 1 is a concept diagram for explaining a wired phone service and a mobile communication phone service in the art.

Turning now to the drawings, FIG. 1 is a concept diagram for explaining a wired phone service and a mobile communication phone service in the art. Referring to FIG. 1, the wired phone service is provided with the aid of a public switched telephone network (PSTN) 10, and a wired phone terminal 80 is connected to a telephone station 70 using a telephone line.

In the case of the wired phone service as described above, portability cannot be provided since the wired phone terminal 80 is connected to the telephone station 70 using the telephone line.

Of course, even though a wireless phone performing a wireless communication with a main body of the wired phone terminal using a 900 MHz wireless bandwidth is being used, there is a problem that its portability is largely limited compared with the mobile communication terminal using the mobile communication service.

On the other hand, the mobile communication service is provided with the mobility using a Public Land Mobile Network (referred to as 'PLMN', hereinafter).

The PLMN includes a Mobile Switching Center (referred to as 'MSC', hereinafter) 30 which takes charge of a mobile communication service in an arbitrary area, a Base Station Controller (referred to as 'BSC', hereinafter) 40, a Base station Transceiver Subsystem (referred to as 'BTS', hereinafter) 50, and a HLR/VLR (Home Location Register/Visitor Location Register) (not shown). In the drawing, the CDMA 20 collectively indicates wireless environments which take charge of mobile communication services in another district.

The MSC 30 performs connection and control of a plurality of BSCs 40 connected to the MSC 30 to other MSCs (not shown) in the PSTN 10 or PLMN 20.

The BSC 40 performs functions of wireless link control and handoff, and the BTS 50 performs functions of constructing a wireless communication path together with its communication service area, that is, a wireless terminal 60 included in its cell area and managing a wireless resource.

In the HLR/VLR (not shown), the HLR performs functions of subscriber location registration and a database for storing subscriber information, and the VLR is a database which temporarily stores information of an MS existing in a cell area of which a corresponding MSC among a plurality of MSCs takes charge. When the MS moves to a cell area where other MSCs manage, information stored in the corresponding VLR is removed.

Even in the case of the mobile communication phone service using the PLMN, it does not interconnectively operate with a wired phone terminal 80 using the public switching telephone network 10 so that there occurs a problem that each service operates independently and does not have interrelationship.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

A mobile phone using a mobile communication network herein means a concept opposite to a wired phone service terminal using a wired phone service, which is used as a wireless phone for convenience. Accordingly, the term "wireless terminal" is to be restricted to the mobile phone.

Figure 2:
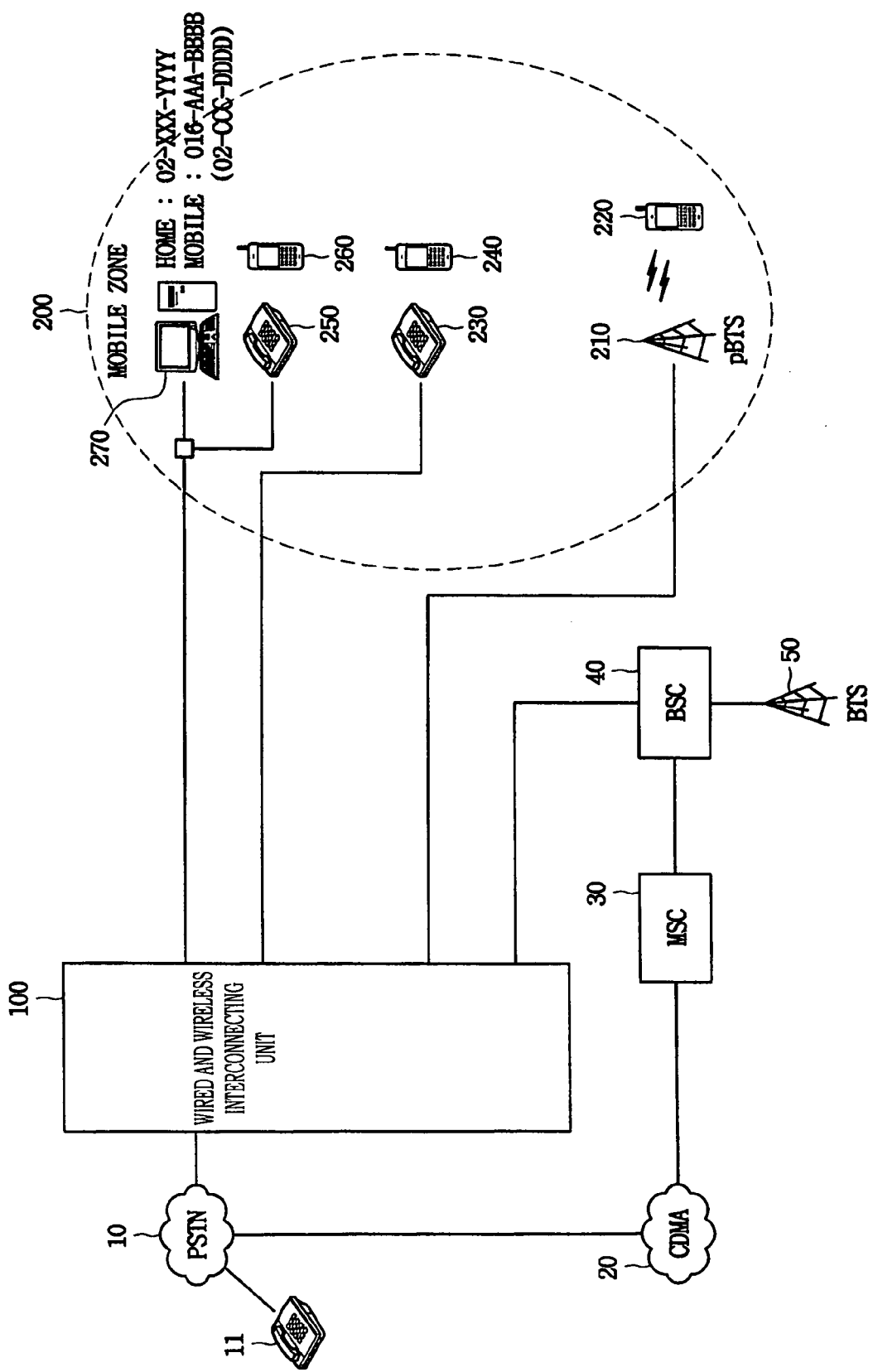
FIG. 2 is a network block diagram for explaining a concept of a system for interconnecting wired phone and wireless phone services in accordance with an embodiment of the present invention.

FIG. 2 is a network block diagram for explaining a concept of a system for interconnecting wired phone and wireless phone services in accordance with an embodiment of the present invention.

Referring to FIG. 2, the system for interconnecting wired phone and wireless phone services in accordance with an embodiment of the present invention includes a wired and wireless interconnecting apparatus 100 which is connected to a PSTN 10 and a BSC 40 of a public mobile communication network, and provides a subscriber who is registered for a service with a wired phone service and a public/private mobile communication service, a private BTS (referred to as 'pBTS', hereinafter) 210 which is connected to the wired and wireless interconnecting apparatus 100 and provides a wireless environment for the private mobile communication service in its communication area, wireless terminals 220, 240 and 260 for providing a public/private mobile communication service through the pBTS 210, and wired phone service terminals 230, 250 and 270 for receiving the wired phone service.

The wired and wireless interconnecting apparatus 100 provides the wired phone service terminals 230, 250 and 270 connected to the apparatus 100 through a telephone line with a wired phone service, and the wireless terminals 220, 240 and 260 which were registered in the private mobile communication service with the public/private mobile communication service through the pBTS 210. Of course, a general wireless terminal (not shown) which was not registered in the private mobile communication service is also provided with the public mobile communication service. Also, a wired and wireless interconnecting service for interconnecting the wired phone service and mobile communication service is performed.

The wired and wireless interconnecting apparatus 100 includes a function of a wired telephone station for performing the wired phone service. That is, the apparatus 100 includes a switching apparatus (not shown) for providing the wired phone service so as to endow a subscriber who was registered in the wired phone service with an individual phone (for example, 02-XXX-YYYY), and provides the wired phone service through a telephone line connected to the wired phone service terminals 230, 250 and 270 installed in for example a subscriber's house or office.

The wired phone service, for example, corresponds to a general wired phone service, which is provided to a subscriber through a telephone station by Korea Telecommunication Corporation, which also includes various supplementary services of an Internet service such as a basic outgoing service and incoming service.

Also, the wired phone service corresponds to an xDSL (x Digital Subscriber Line) subscriber circuit service recently spread abruptly.

Accordingly, the wired and wireless interconnecting apparatus 100 may be desirably embodied by interconnecting with a conventional exchange installed in a telephone station, embodied by improving an exchange installed in the telephone station, or embodied in a private switching network having a private exchange.

The wired phone service terminal which can be provided with the wired phone service from the wired and wireless interconnecting apparatus 100 may be general wired phones 230 and 250, and may correspond to a personal computer 270 and various equipment (not shown) for a home network. The general wired phones 230 and 250 may include a main body connected through a telephone line and a mobile terminal using a signal with a frequency of 800 MHz (megahertz).

On the other hand, the wired and wireless interconnecting apparatus 100 operates a private mobile communication network in a limited communication area 200.

Here, the private mobile communication network means a mobile communication service for providing its subscriber with a good quality of service in a restricted area in which its base station can be supported by installing a limited number of base stations in an arbitrary area, which is generally used for the purpose of discriminating it from the mobile communication network which is operated all over the country by various mobile communication service providers (for example, 01X in Korea).

Accordingly, an arbitrary exchange provider and mobile communication apparatus provider may interconnectedly provide such a service. In addition, a service provider having an existing wired phone network (for example, KTC in Korea) can also install the mobile communication apparatus and embody such a service.

In order to perform the service described above, the wired and wireless interconnecting apparatus 100 includes an apparatus (not shown) for the mobile communication service and endows a subscriber who is registered in the mobile communication phone service with a Mobile Identifier Number (MIN) (for example, 02-CCC-DDDD), and provides wireless terminals 230, 250 and 270 placed in its private communication area with a mobile communication phone service through the pBTS 210.

Of course, since the wireless terminals 230, 250 and 270 which are registered in the mobile communication service of the wired and wireless interconnecting apparatus 100 are registered in a service of the public mobile communication network and provided with a mobile communication service which uses a general public mobile communication network, the terminals are endowed with separate mobile communication terminal phone numbers (MINs) (for example, 016-AAA-BBBB).

At this time, the separate phone number with which the wired and wireless interconnecting apparatus 100 endows the mobile terminal registered in the mobile communication service uses a wired phone number format (for example, 02-CCC-DDDD). The reason why the individual phone number uses the wired phone number format is that, when an external subscriber using the wired phone service makes a call for a corresponding subscriber by way of the PSTN 10, the external subscriber is to be regarded as a general wired phone service subscriber. Accordingly, the external subscriber can make a call to the corresponding subscriber as if he/she makes a call to a general wired phone service subscriber, and the fare (or rate) is also adjusted as if the call is made to the general wired phone service subscriber. Accordingly, such a phone number is called a virtual phone number. The virtual phone number is a phone number whose format is the general wired phone format, which is not a phone number connected to an arbitrary wired phone terminal through a phone line but is a phone number generated in a software scheme in the wired and wireless interconnecting apparatus 100.

Accordingly, the wired and wireless interconnecting apparatus 100 can have three kinds of subscribers in large part.

Firstly, there is a subscriber who uses only a wired phone service. Such a subscriber is endowed with an arbitrary wired phone number from the wired and wireless interconnecting apparatus 100 and uses the wired phone service by connecting the wired terminal to a telephone line installed in his/her house.

Next, there is a subscriber who uses only a mobile communication service. Such a subscriber is simultaneously registered in a public mobile communication network. Accordingly, the subscriber is endowed with two phone numbers. One is a phone number which is endowed in a public mobile communication network, and the other is a phone number which is endowed in the wired and wireless interconnecting apparatus 100. The wired and wireless interconnecting apparatus 100 stores information for a phone number with which the apparatus 100 has endowed for the corresponding subscriber and a phone number which was endowed by the mobile communication service provider.

Finally, there is a subscriber who uses the wired phone service and the mobile communication service simultaneously. In this case, the subscriber is endowed with an arbitrary wired phone number from the wired and wireless interconnecting apparatus 100 and uses the wired phone service by connecting the wired terminal to the telephone line installed in his/her house, and also uses the mobile communication service using the wired terminal. Accordingly, this subscriber is endowed with three phone numbers. One of them is a wired phone number which is endowed in the wired terminal, another number is a phone number which is endowed for the wireless terminal in the public mobile communication network, and yet another number is a virtual phone number which is endowed to the wireless terminal in the wired and wireless interconnecting apparatus 100. Accordingly, the wired and wireless interconnecting apparatus 100 stores information of the three phone numbers for the corresponding subscriber in a database.

The wired and wireless interconnecting apparatus 100 can provide each subscriber with a discriminated service.

The subscriber who uses only the general wired phone service is provided with an outgoing/incoming service by the general wired phone service through the telephone line.

In the case that the subscriber who uses only the mobile communication service is requested an outgoing call through the wireless terminal, as the call ID (identification) is coming on the MIN (016-AAA-BBBB) which is endowed with only the public mobile communication from the corresponding wireless terminal, the MIN is transformed into the virtual phone number (02-CCC-DDDD) and it transmits the transformed caller ID through the PSTN 10. Accordingly, the external subscriber receives the caller ID information for the virtual phone number with respect to the corresponding call.

The subscriber who uses the wired phone service and the mobile communication service can be provided with a multiple terminating function. The multiple terminating function is a function in which a ring signal is transferred to the wired phone service terminal and wireless terminal simultaneously.

That is, in the case that a phone number of the wired phone service terminal (02-XXX-YYYY) is called externally, the ring signal is transmitted to the wired phone terminal corresponding to the wired phone number through the telephone line, and a virtual phone number which is registered in a subscriber having the corresponding wired phone number is searched for and the corresponding wireless terminal is called through the pBST 210. Also, in the case that there is no response from the corresponding wireless terminal even though the corresponding wireless terminal has been called through the pBST 210, it is determined that the corresponding wireless terminal is not in a private communication service area, and the corresponding wireless terminal is called through the BTS 50 of the public mobile communication network by way of the public mobile communication network.

In this case, the wired and wireless interconnecting apparatus 100 has to have a database for each phone number. For example, the apparatus 100 has to have a database for whether a multiple terminating function is established with respect to an arbitrary phone number, a virtual phone number for each corresponding wired phone number in the case that the multiple terminating function was established, and a virtual phone number for each phone number of the public mobile communication network.

In the case that there is a call connection request from an arbitrary extension subscriber for an extension subscriber or an external subscriber, or the extension subscriber is called from an arbitrary external subscriber, a corresponding call connection service can be proceeded.

That is, when the wireless terminals 220, 240 and 260 are registered for usage in the wired and wireless interconnecting apparatus 100 in order to receive a mobile communication service, the wired and wireless interconnecting apparatus 100 provides the wireless terminals 220, 240 and 260 with the mobile communication service through the pBTS 210.

The wired and wireless interconnecting apparatus 100 performs a wired communication service with the PSTN 10. As an example, when a wireless terminal which is registered in the wired and wireless interconnecting apparatus 100 wishes to communicate with a wireless terminal (not shown) which is not registered in the wired and wireless interconnecting apparatus 100, the wired and wireless interconnecting apparatus 100 is connected to a public mobile communication network by way of the PSTN 10 and establishes a communication path to the corresponding wireless terminal to make a speech.

The wired and wireless interconnecting apparatus 100 establishes the communication path to the public network subscriber through the PSTN 10 to make the communication when the service registered wireless terminals 220, 240 and 260 wish to communicate with not the extension line subscriber but the public network subscriber 11.

On the other hand, when the wireless terminals 220, 240 and 260 which are registered for usage of the private mobile communication service in the wired and wireless interconnecting apparatus 100 within a communication area (referred to as a mobile zone, hereinafter) of the pBTS 210 requests wireless communication path establishment, the pBTS 210 constructs the wireless communication path and manages wireless resources so that it provides a public/private mobile communication service.

Furthermore, as to a wireless terminal which was not registered in the private mobile communication service, a public mobile communication service is provided through the public mobile communication network.

Also, the wireless terminals 220, 240 and 260 are provided with a speech service with other wireless terminals 220, 240 and 260 which are registered for usage of the private mobile communication service or the wired phone service terminals 230, 250 and 270 through the wired and wireless interconnecting apparatus 100.

That is, in the case that the wireless terminals 220, 240 and 260 which are registered for usage of the mobile communication service in the wired and wireless interconnecting apparatus 100 requests the wireless communication path establishment, the pBTS 210 establishes a wireless communication path to make a speech, and in the case that a wireless terminal (not shown) which is not registered for usage of the private mobile communication service in the wired and wireless interconnecting apparatus 100 requests the wireless communication path establishment, the pBTS 210 makes it possible to use the public mobile communication network through the BSC 40.

For a service operation of the system for interconnecting the wired and wireless constructed as described above, the following process is needed.

First of all, a subscriber registration application for the wired and wireless service is received from an arbitrary extension subscriber. Information requested when the subscriber registration is applied may include personal affair information for the subscriber, settlement information, a telephone number of a wired terminal, an individual telephone number of the mobile communication terminal, and a virtual wired telephone number of the mobile communication terminal. Here, the personal affair information includes a name, an address and an identification number.

According to the subscriber registration application, one or more wired terminals and public/private mobile communication terminals are endowed with wired phone numbers and the wired and wireless service registrations are performed in each of the extension subscribers.

When the wired and wireless services are registered, a process is performed wherein a wired phone number with which a wired terminal constructing the extension network is endowed, a wired phone number with which public/private mobile communication terminals are endowed, and the mobile identifier number (MIN) with which the public/private mobile communication terminal is endowed from the public mobile communication network are registered as extension subscriber information in the database.

Next, a process is performed wherein first identification information indicating whether an arbitrary wired phone number is a wired phone number connected to a terminal or not, second identification information indicating whether the wired phone number uses a simultaneous terminating service or not, and wired phone numbers of public/private mobile communication terminals which are called by a simultaneous terminating function are registered in a database. After finishing the registration process, in the case that an arbitrary wired phone number is called, a wired terminal corresponding to the corresponding wired phone number is called and interconnected to the wired phone number so that, in the case that there are public/private mobile communication terminals which are called simultaneously, the corresponding public/private mobile communication terminals are called through the mobile communication network. A process to charge fares according to the wired and wireless services in each of the extension subscribers can be performed. In the case that the private mobile communication network is used when the charge is performed, the extension billing rate may be applied, and in the case that the public mobile communication network is used, external line billing rate may be applied.

Figure 3:
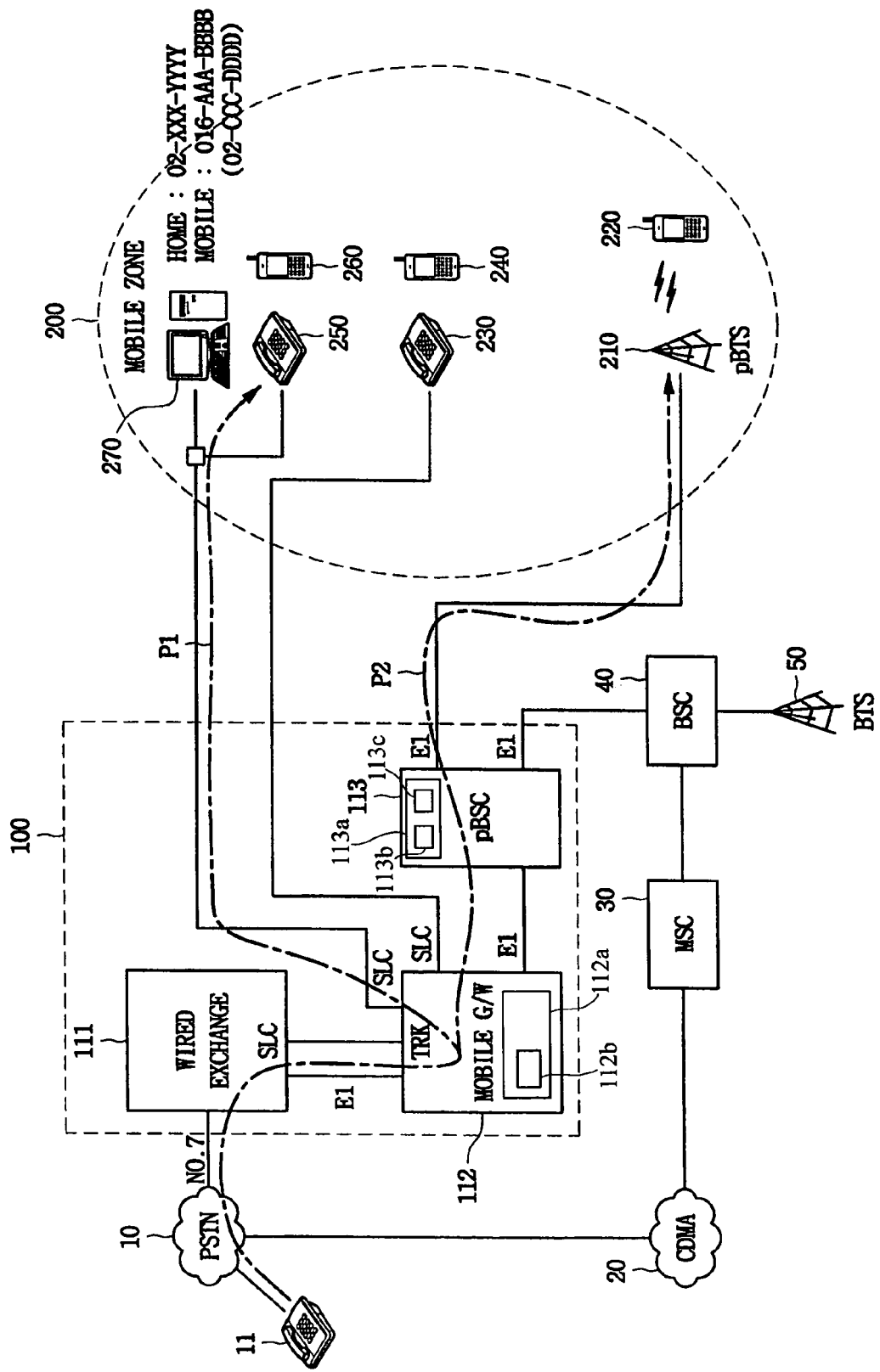
FIG. 3 is a system block diagram for explaining a concept of the system for interconnecting the wired and wireless phone services in accordance with an embodiment shown in FIG. 2.

FIG. 3 is a system block diagram for explaining a concept of the system for interconnecting the wired and wireless phone services in accordance with an embodiment of shown in FIG. 2.

Referring to FIG. 3, the wired and wireless interconnecting apparatus 100 includes a wired exchange 111, a mobile gateway 112, and a pBSC 113.

The wired exchange 111 is an exchanging system for providing the wired phone network with a service, and the mobile gateway 112 is a system for processing a call which is generated in the wired and wireless subscriber. The pBSC 113 connects the mobile gateway 112 to the pBTS 210, and is also connected to the BSC 40 of the public mobile communication network for a general public mobile communication service.

The embodiment is an example where the mobile gateway 112 is used as an exchange interconnected to the wired exchange 111 and the PSTN 10 is connected to a trunk of the wired exchange 111 through NO. 7 signaling (signaling system no. 7, common channel signaling system defined by CCIT (International Telegraph and Telephone Consultive Committee)).

In the wired exchange 111, an extension Subscriber Line Card (SLC) interface is connected to the trunk of the mobile gateway 112 through an E1 signaling (E1 is a European standard for a 2.048 Mbit/s digital line containing 32 time slots, another example is T1 which is a digital signal level 1 (DS1) for a 24 channel 1.544 Mbit/s digital line and also T3 (DS3) being digital signal level 3 operating at 44.736 Mbit/s).

That is, in the case that the wired exchange 111 assigns a wired phone number with respect to an arbitrary subscriber for the wired phone service, the exchange 111 does not directly connect the SLC interface to which the wired phone number is assigned to the wired phone terminal 250 of the subscriber through the telephone line, but at first connects the SLC interface to the trunk of the mobile gateway 112 and then carries it to the mobile gateway 112.

The mobile gateway 112 assigns an extension subscriber line of the wired phone service of the wired exchange 111 which is received through the trunk to its SLC interface and connects the line to the corresponding wired phone terminal 250 through the telephone line.

Accordingly, the wired phone terminal 250 is connected to the SLC interface of the wired exchange 111 by way of the SLC interface of the mobile gateway 112 and the trunk. Therefore, the wired phone terminal 250 can hear a dial tone provided by the wired phone exchange 111 in the case that the user hooks off the receiver for speech.

Furthermore, the wired exchange 111 can assign a wired phone number to each subscriber within the range which the SLC interface can afford as the exchange 111 provides its extension subscriber with the wired phone service. The wired exchange 111 may include a database (included in a memory) including the wired phone number with which each extension subscriber is endowed.

Here, the wired phone number may be a normally used number whose end is connected to the wired phone terminal 250, and a virtual phone number whose end is not connected to the wired phone terminal 250 and in which only the phone number is assigned.

However, in the wired exchange 111, the general wired phone number and virtual wired phone number are not discriminated. It is because the wired exchange 111 assigns a phone number with respect to an arbitrary extension subscriber to the SLC (Subscriber Line Card) interface and carries it to the trunk of the mobile gateway 112 through the SLC interface, and whether the wired phone terminal 250 is connected to an end of the assigned phone number as its role is ended is up to the mobile gateway 112 and the wired exchange 111 is controlled using extension subscriber information in the same manner.

The mobile gateway 112 is connected to the pBSC 113 through the E1 signaling, and functions to interconnect the wired phone service of the wired exchange 111 to the mobile communication service of the pBSC 113.

That is, a circuit assigned by connecting the mobile gateway 112 to the pBSC 113 through the E1 signaling is concerned with the wireless terminal.

Figure 4:
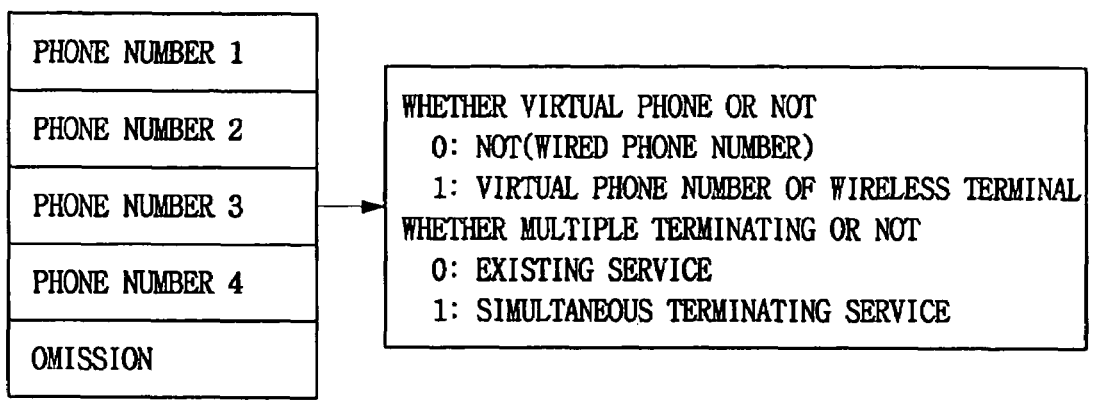
FIG. 4 is a diagram showing a construction example of a database storing information indicating whether each phone number is a virtual phone number, and information indicating whether each phone number is registered in the multiple terminating services.

The mobile gateway 112 has a database 112*b* (included for example in a memory 112*a*) with respect to the wired phone number endowed by the wired exchange 111. That is, this database stores information indicating whether each phone number is a virtual phone number, and information indicating whether each phone number is registered in the multiple terminating services as shown in FIG. 4.

For example, when a field indicating whether it is the virtual phone or not is establish with 0, it means that the phone number is a wired phone number connected to the wired terminal, and the field is filled with 1, it means that the phone number is a virtual phone number.

On the other hand, when a field indicating whether the multiple terminating is performed or not is filled with 0, it means that the service is restricted to an existing one which makes a call to the wired phone terminal corresponding to the corresponding wired phone number, and when the field indicating whether the multiple terminating is performed or not is filled with 1, it means that the service was registered in the service which performs the multiple terminating.

Accordingly, in the case that an arbitrary wired phone number which was registered in the multiple terminating service is called, as detailed information on the virtual wired phone number corresponding to the wireless terminal which is simultaneously called with the wired phone number is needed, the mobile gateway 112 requests the information to the pBSC 113.

When the information on the virtual phone number of the wireless terminal connected to the corresponding wired phone number is received from the pBSC 113, the wireless terminal corresponding to the virtual phone number is called through the pBSC 113 and the pBST 210 after searching for the corresponding virtual phone number in its database.

On the other hand, the mobile gateway 112 transfers the outgoing number and a caller ID of the mobile terminal which is received from the corresponding wireless terminal to the wired exchange 111, when the mobile gateway 112 receives outgoing service request from an arbitrary terminal through the pBSC 113.

At this time, the caller ID of the wired terminal transferred to the wired exchange 111 becomes a virtual wired phone number (for example, 02-CCC-DDDD) with which its wireless terminal was endowed. Accordingly, the wired exchange 111 carries its caller ID and makes a call to the subscriber of the corresponding outgoing number.

Here, the subscriber of the outgoing call may be an internal subscriber of the wired exchange 111 and be an external subscriber who can be called through the PSTN 10.

The pBSC 113 performs functions corresponding to the BSC in the public mobile communication system, that is, a mobile link control and a hand off.

The pBSC 113 controls the pBTS 210 to perform a call process of the subscriber for supporting public mobile communication network and private mobile communication network services and an analysis of the supplementary services, and to process all sorts of interfaces for interconnecting to the mobile gateway 112.

For doing that, in the case of receiving the private mobile communication service, the wireless terminal subscriber adds identification information established in advance to the outgoing phone number in order to discriminate the services.

Accordingly, the pBSC 113 discriminates whether the outgoing call requires a public mobile communication service or a private mobile communication service using this identification information.

That is, it is determined whether the outgoing call of the wireless terminal transferred from the pBTS 210 is the outgoing call requesting the public mobile communication service or the outgoing call requesting the private mobile communication service, and the outgoing call is transparently bypassed to the BSC 40 of the public mobile communication network when it is the public mobile communication service outgoing call, and the outgoing call is transferred to the mobile gateway 112 to provide the private mobile communication service when it is the private mobile communication service outgoing call.

For example, when a user input a phone number "#212" through the wireless terminal, it is determined that the pBSC 113 wishes to use the private mobile communication service since it includes an identifier "#" indicating that the user wishes to use the private mobile communication service, and a speech request signal including the phone number "212" is transmitted to the mobile gateway 112 and it is possible to talk to an extension subscriber of "212".

When the user inputs a phone number "#02-212-8866", the pBSC 113 determines that the user wishes to use the private mobile communication service since the number includes the identifier '#' indicating that the user wishes to use the private mobile communication service, and the pBSC 113 transmits a speech request signal including a phone number "02-212-8866" to the mobile gateway 112 and makes it possible for speech to a public phone network subscriber of "02-212-8866" through a public phone network using the wired exchange 111.

When the user inputs a phone number "#016-212-8866", the pBSC 113 determines that the user wishes to use the private mobile communication service since the number includes the identifier '#' indicating that the user wishes to use the private mobile communication service, and the pBSC 113 transmits a speech request signal including the phone number "016-212-8866" to the mobile gateway 112 and makes it possible for speech to a public mobile communication service subscriber of "016-212-8866" through the public mobile communication network by way of a public phone network using the wired exchange 111. Identifiers other than '#' can also be used.

Figure 5:
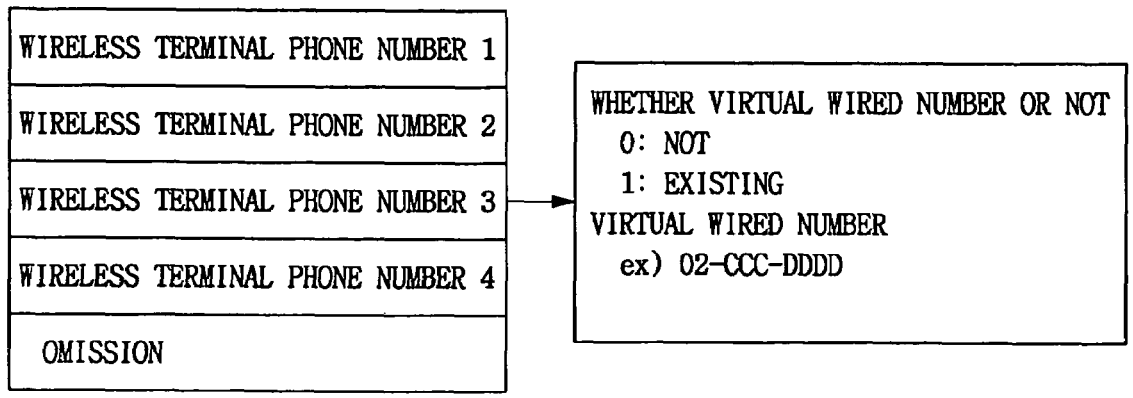
FIG. 5 is a diagram showing a construction example of a database storing information of a wireless terminal and information of a virtual phone number with which the wireless terminal is endowed.

The pBSC 113 includes an MIN number (for example, 016-AAA-BBBB) with which a public mobile communication network has endowed in an arbitrary wireless terminal, and a database 113*b* (included for example a memory 113*a*) with respect to a virtual wired phone number (for example, 02-CCC-DDDD) with which its wireless terminal was endowed, as shown in FIG. 5.

That is, the database 113*b* stores information indicating whether a virtual wired number exists in each of the MIN numbers of an arbitrary wireless terminal, and its wired number information in the case that there is the corresponding virtual wired number.

For example, when a field indicating whether there is a virtual wired number is established with 0, it means that there is no virtual wired number, and when the field is established with 1, it means that there is a virtual wired number corresponding to the MIN number and the virtual wired number corresponding to it is stored.

Accordingly, even in the case that the virtual wired phone number in the mobile gateway 112 is called, it is possible to call the corresponding wireless terminal.

On the other hand, when an arbitrary wireless terminal requests an outgoing service through the pBTS 210, it can be divided into two cases in large part.

Firstly, there may be a case that an outgoing is requested using a private mobile communication service. In this case, as the MIN number with which a public mobile communication network was endowed is carried using a caller ID transferred from the pBTS 210, the caller ID is transformed into a virtual wired phone number with reference to the database 113b shown in FIG. 5, and sent out through the mobile gateway 112 and wired exchange 111.

In the case of not using the private mobile communication service, as the MIN number with which the public mobile communication network was endowed is carried using a caller ID transferred from the pBTS 210, the caller ID is transferred to the BSC 40 of the public mobile communication network as it is.

Also, the pBSC 113 manages a database 113c (included for example in memory 113a) for the multiple terminating services. That is, the pBSC 113 manages the database 113c with respect to a wired phone number (for example, 02-XXX-YYYY) whose multiple terminating function among the wired phone terminals installed in a house is established and the virtual wired phone number with which the wireless terminal was simultaneously endowed when calling the corresponding wired phone number.

Accordingly, in the case that the mobile gateway 112 queries a virtual wired phone number which is multiply established with respect to the wired phone number (for example, 02-XXX-YYYY) which was registered in the multiple terminating service, a virtual phone number (02-CCC-DDDD) which is linked to the wired phone number is found by searching for the corresponding wired phone number (for example, 02-XXX-YYYY) in the database, and a response can be made to the mobile gateway 112.

That is, the databases (112b and 113c) are constructed in each of the mobile gateway 112 and pBSC 113 for the multiple terminating services. The database 112b (included for example in memory 112a) which is constructed in the mobile gateway 112 stores information on whether an arbitrary wired phone number is multiply terminated and the virtual wired phone number with which each wireless terminal was endowed.

On the other hand, the database 113c (included for example in memory 113a) which is constructed in the pBSC 113 stores information on an arbitrary wired phone number in which a multiple terminating function is established and a virtual wired phone number of the wireless terminal which will be called in the multiple terminating in the wired phone number. The databases 113c and 113b can also be a single database.

In the wired and wireless interconnecting apparatus 100 constructed as described above, it is possible not only to make the wired phone service with respect to the wired phone terminal, but also to terminate a call to an assigned wired terminal when making a call of the virtual wired phone.

In addition, it is possible to make both wired and wireless calls simultaneously in the mobile gateway 112 when the wired phone is called, and terminate the call to a desired terminal.

In the case that a call for the virtual wired phone is made in the PSTN 10, the wired exchange 111 makes a call to the mobile gateway 112. The mobile gateway 112 makes a call to the wireless terminal in the mobile zone 200 through the pBSC 113 and pBTS 210 corresponding to the virtual wired phone number.

When a terminating response comes from the wireless terminal, the call is connected. When the terminating response does not come, the service is ended according to a wired phone service process.

Figure 6:
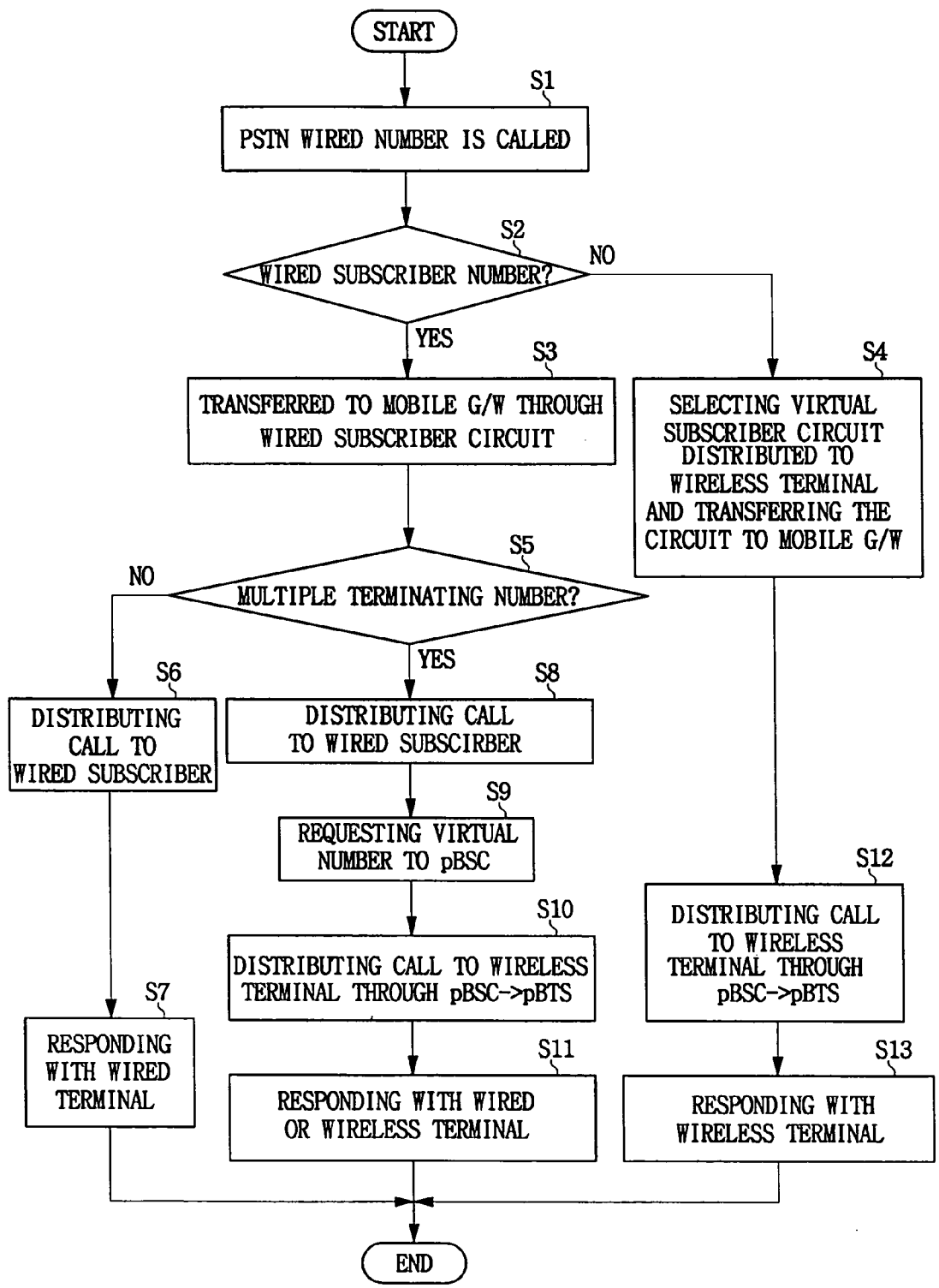
FIG. 6 is a diagram showing a process in which a wired phone and a wireless terminal are simultaneously called when making a call to the wired phone in the system for interconnecting the wired and wireless phone services shown in FIG. 3.

FIG. 6 is a diagram showing a process of making a call to corresponding wired phone or wireless phone when making a call to the wired phone in the system for interconnecting the wired and wireless phone services shown in FIG. 3.

With reference to a terminating path (P1, P2) shown in FIG. 3, a terminating process will be explained.

In the case that an arbitrary subscriber terminal 11 makes a call to an arbitrary wired phone number through the PSTN 10, the wired exchange 111 is called the corresponding wired phone number through the PSTN 10 (S1) and determines whether the called phone number is the wired subscriber number or not (S2). As a result of the determination, in the case that the called phone number is the wired subscriber number, it is transferred to the mobile gateway 112 through the wired subscriber circuit (S3). On the other hand, in the case that it is not the wired subscriber number as a result of the determination, a virtual subscriber circuit distributed to the wireless terminal is selected and transferred to the mobile gateway 112 (S4).

The mobile gateway 112 analyzes the phone number transferred from the wired exchange 111. First of all, the mobile gateway 112 determines whether the corresponding phone number in the database 112b shown in FIG. 4 which is owned by the gateway 112 is a multiple terminating number or not (S5). As a result of the determination, in the case that it is not the multiple terminating number, the call is distributed to the wired subscriber (S6). Then, the wired terminal 250 responds to the distribution (S7).

On the other hand, if the corresponding number is the multiple terminating number as a result of the determination, the call is distributed to the wired subscriber at first (S8)(P1). Moreover, the virtual wired phone number assigned to the corresponding wired number is requested to the pBSC 113 (S9). The reason why the mobile gateway 112 requests the virtual wired phone number to the pBSC 113 is that the database 112b of the mobile gateway 112 stores information indicating only whether the multiple terminating for an arbitrary wired terminal is established or not.

Since the pBSC 113 stores direct information with respect to the corresponding wireless terminal to which the multiple terminating is established for the wired number, the mobile gateway 112 requests the virtual wired phone number corresponding to the wireless terminal which is multiply terminated to the pBSC 113 from the mobile gateway 112.

Accordingly, the pBSC 113 searches for the virtual number with respect to the corresponding wired phone number in its database and provides the mobile gateway 112 with the virtual number. The mobile gateway 112 distributes the call to the corresponding wireless terminal 220 through the pBSC 113 and pBTS 210 (S10)(P2). Accordingly, one of the wired terminal 250 and the wireless terminal 220 responds to the distribution (S11). Also, the terminating service can be provided anywhere in the mobile zone 200 with the wireless terminal when the wireless terminal does not respond to the distribution.

On the other hand, when it is determined whether the called phone number is the wired subscriber number (S2), in the case that the called phone number is not the wired subscriber number, the mobile gateway 112 distributes the call to the corresponding wireless terminal through the pBSC 113 and pBTS 210 (S12) after selecting the virtual subscriber circuit distributed to the wireless terminal and transferring the circuit to the mobile gateway 112 (S4). Accordingly, the corresponding wireless terminal 220 responds to the distribution (S13).

Figure 7:
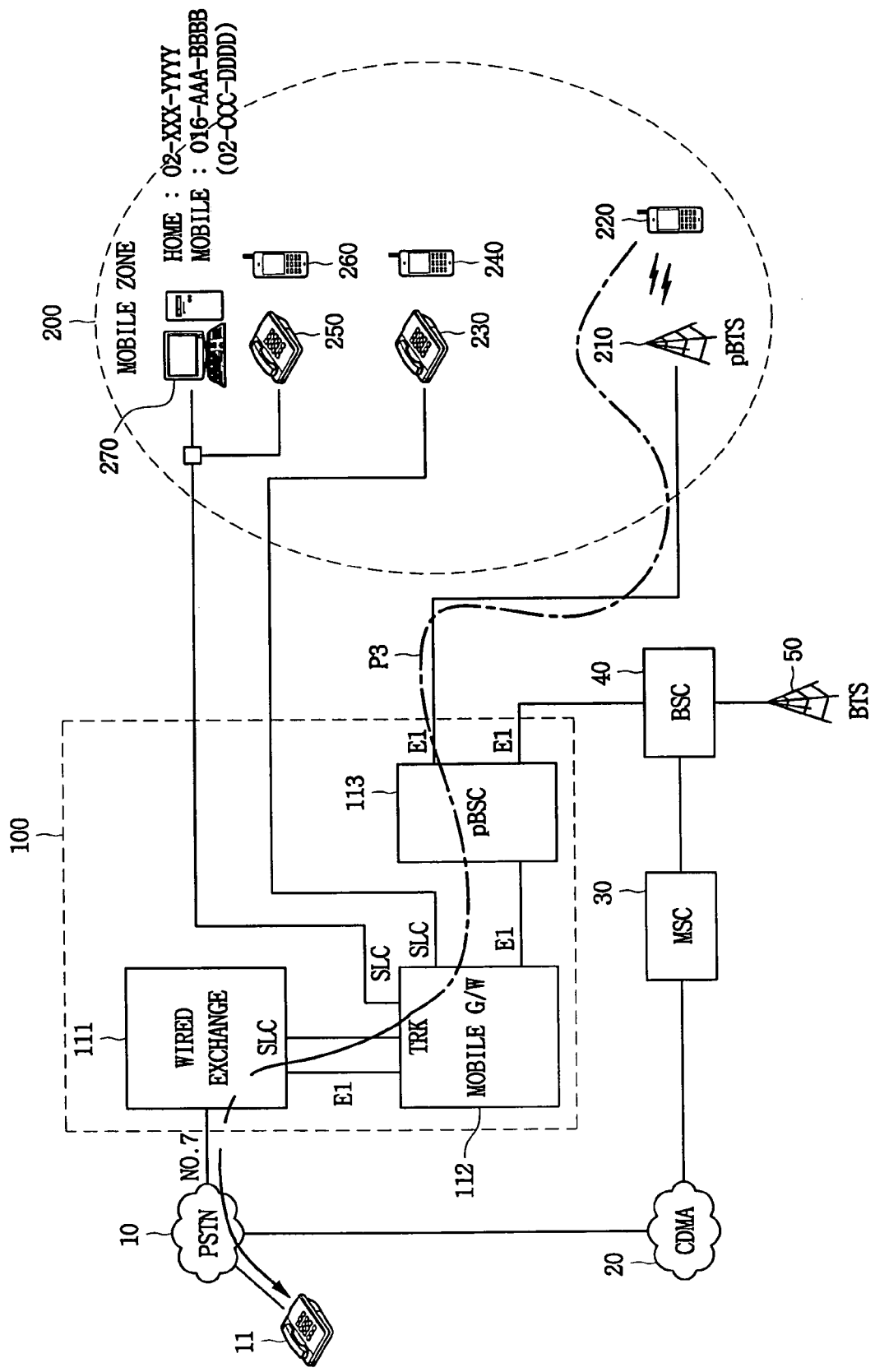
FIG. 7 is a diagram showing a process in which a wireless terminal subscriber makes a call to an external subscriber.
Figure 8:
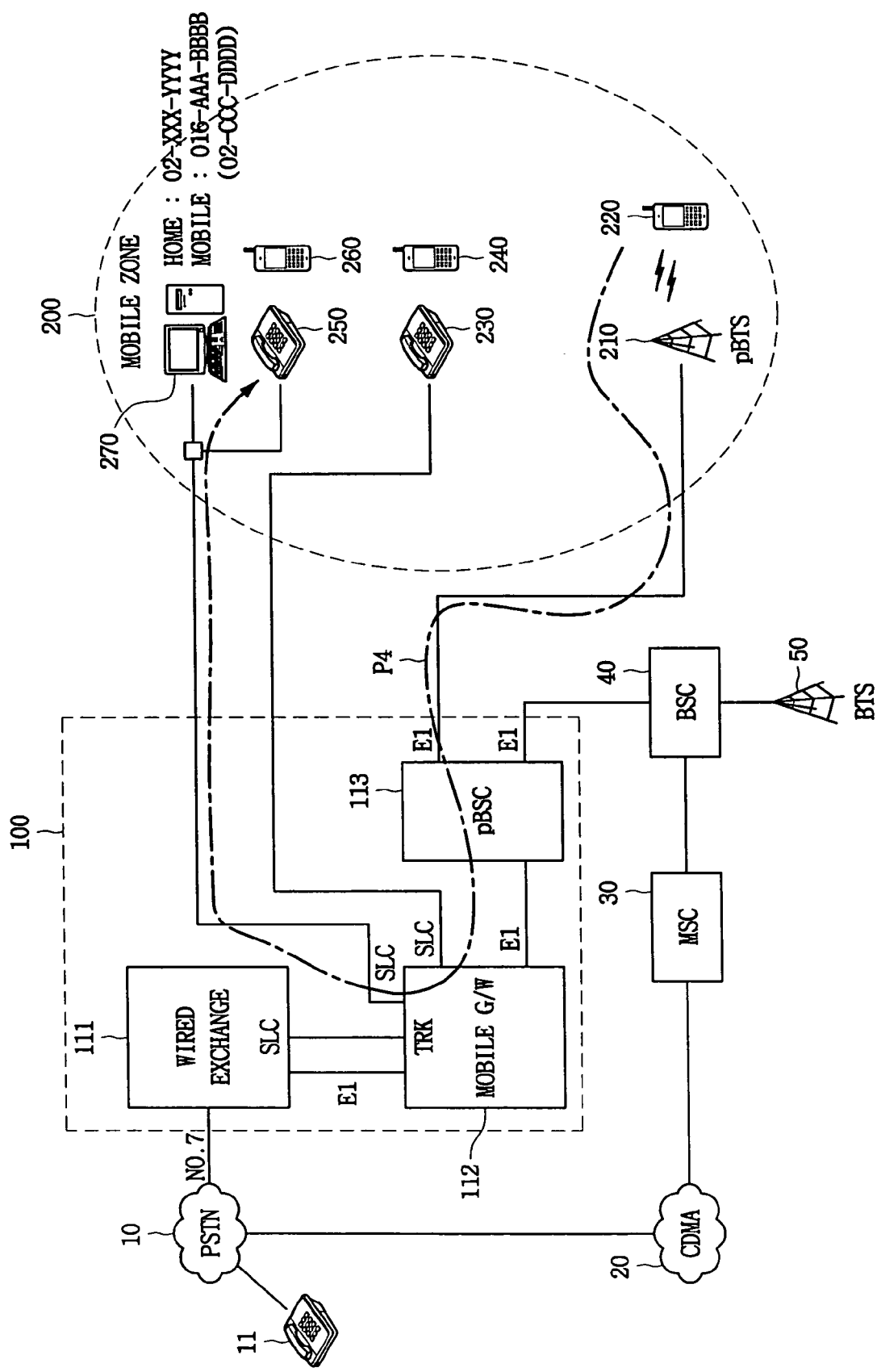
FIG. 8 is a diagram showing a process in which a wireless terminal subscriber makes a call to an internal subscriber.
Figure 9:
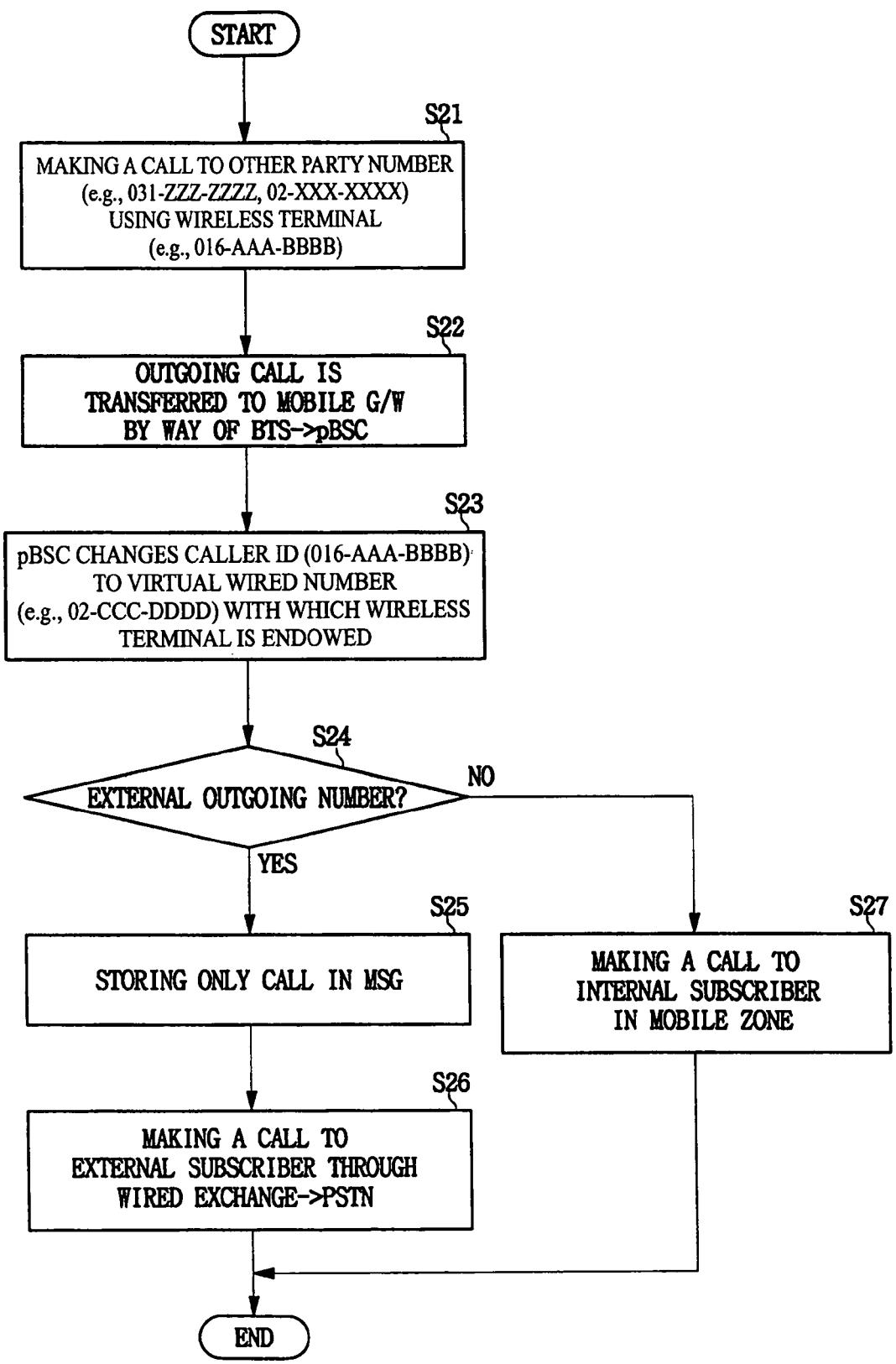
FIG. 9 is a flow chart in which the wireless terminal subscriber makes a call to the external subscriber or the internal subscriber in FIGS. 7 and 8.

FIG. 7 is a diagram showing a process in which a wireless terminal subscriber makes a call to an external subscriber, FIG. 8 is a diagram showing a process in which a wireless terminal subscriber makes a call to an internal subscriber, and FIG. 9 is a flow chart in which a wireless terminal subscriber makes a call to an external subscriber or an internal subscriber.

With reference to a terminating path (P3) of FIG. 7 and a terminating path (P4) of FIG. 8, a terminating process of FIG. 9 is explained.

The wireless terminal 220 (for example, 016-AAA-BBBB) makes a call to the other party's number (for example, 031-ZZZ-ZZZZ, or 02-XXX-XXXX) (S21). The outgoing call generated in the wireless terminal 220 is transferred to the mobile gateway 112 through the pBTS 210 and pBSC 113 (S22).

At this time, the pBSC 112 changes a caller ID (016-AAA-BBBB) with which the wireless terminal is endowed to the virtual wired number (for example, 02-CCC-DDDD) (S23). Here, the change of the caller ID is performed with reference to the database 113b of FIG. 5.

The mobile gateway 112 determines whether the outgoing number sent out from the wireless terminal is an external outgoing number or not (S24). In the case that it is the external outgoing number, the call is stored in a message and transferred to the wired exchange 111 (S25). The wired exchange 111 makes a call to an external subscriber of the corresponding phone number through the PSTN 10 (P3) (S26).

On the other hand, it is determined that the outgoing number is not the external outgoing number when the mobile gateway 112 determines whether the outgoing number sent out from the wireless terminal is the external outgoing number or not, the internal subscribers 220, 240 and 260 in the mobile zone 200 are called (P4)(S27).

At this time, an accounting process can be performed through accounting equipment (not shown) connected to the wired exchange 111. Here, a speech between the internal subscribers performed in the wired and wireless interconnecting apparatus 100 within the mobile zone 200 is not specially charged and can be freely operated. In such a case, the internal subscribers can make a speech with one another without charging for the speech.

Figure 10:
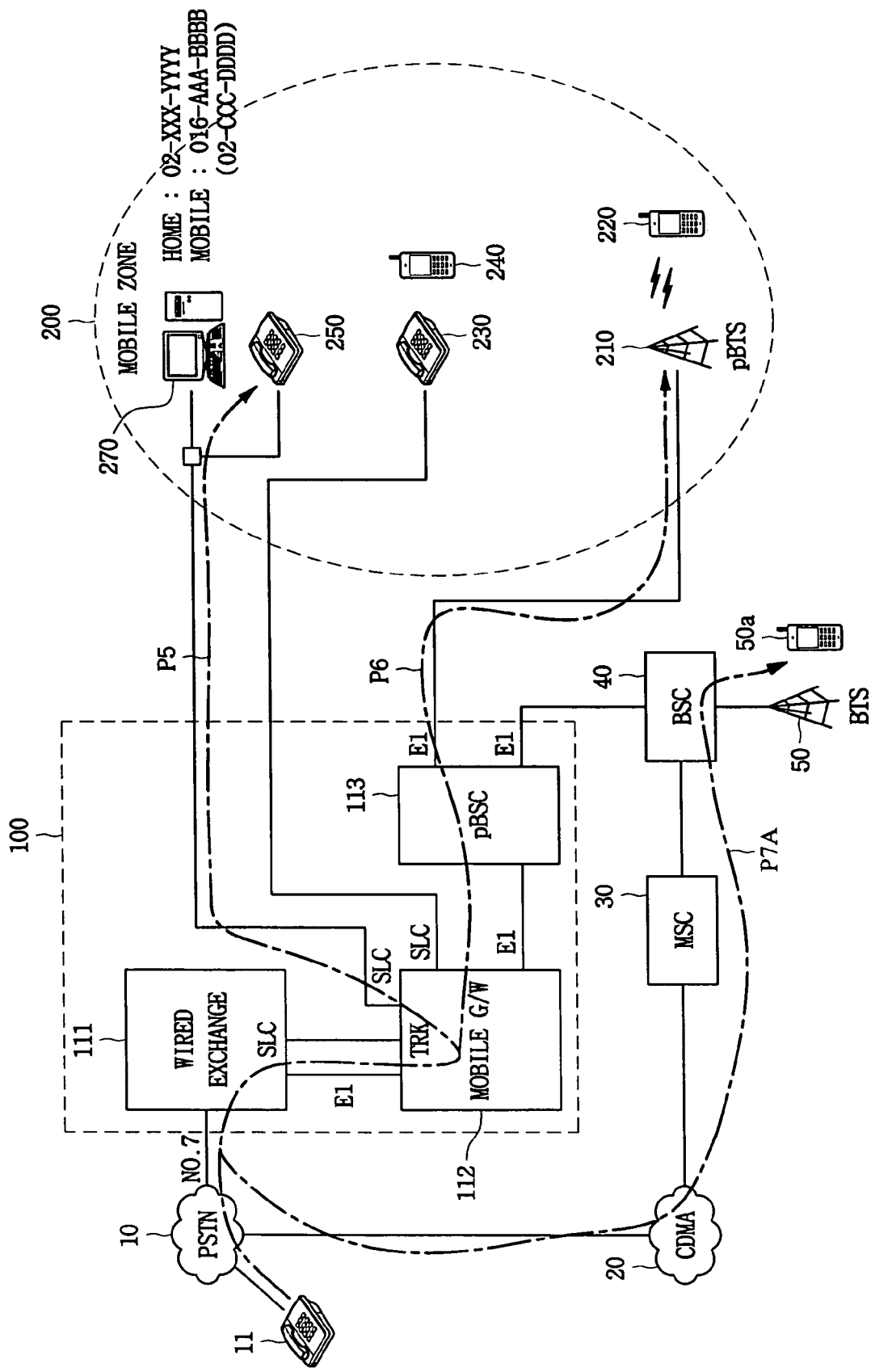
FIG. 10 is a diagram showing a process in which an incoming call is re-routed when the mobile zone has nothing.
Figure 11:
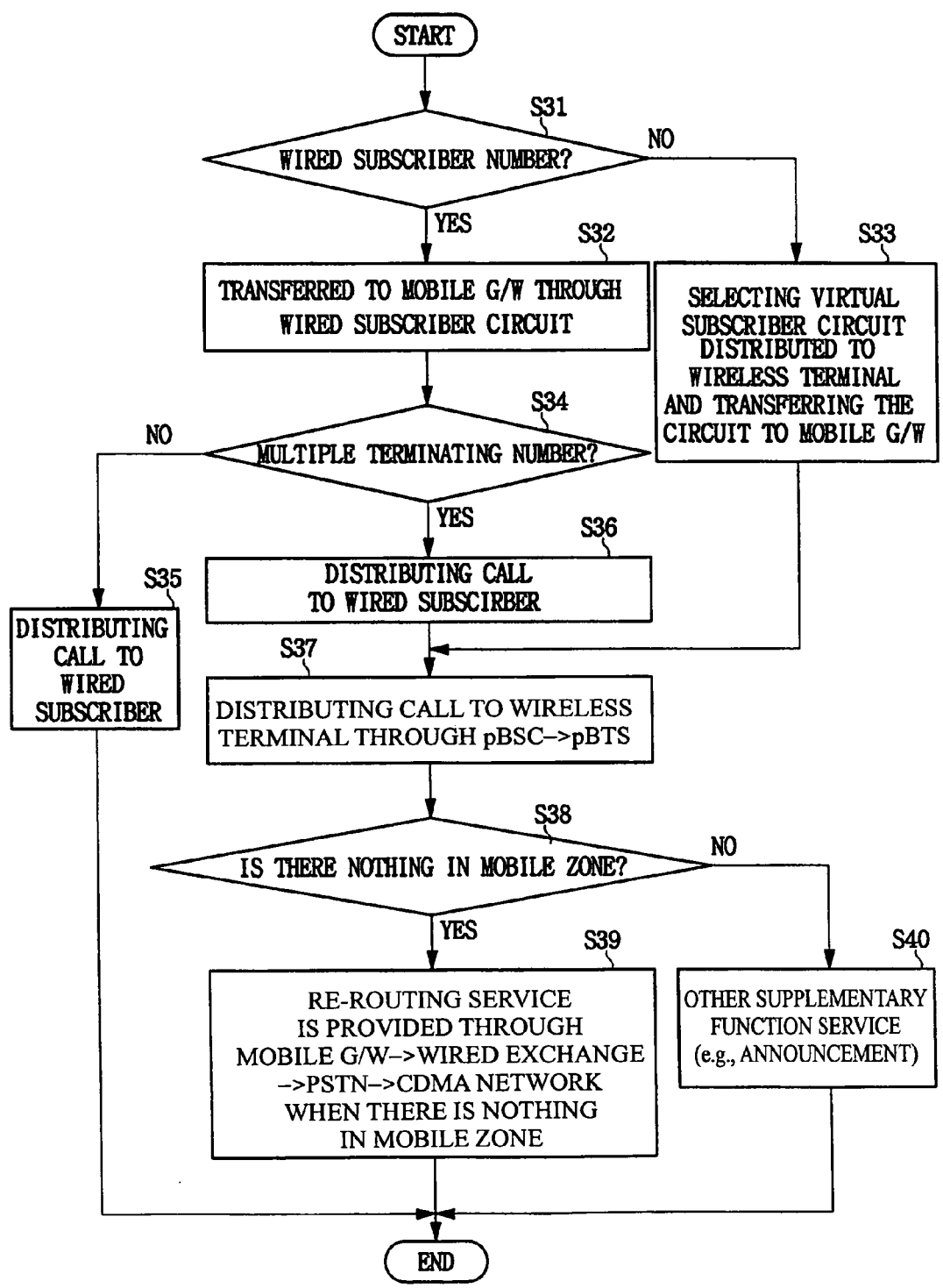
FIG. 11 is a flow chart of a process in which an incoming call is re-routed when a mobile zone has nothing.

FIGS. 10 and 11 are diagrams showing a process in which an incoming call is re-routed when the mobile zone has nothing (i.e., no existence of the subscriber in mobile zone 200 while there is no response of the wired terminal or wireless terminal in the mobile zone 200).

The re-routing process of FIG. 11 will be explained with reference to the terminating path (P5, P6 and P7A) of FIG. 10.

In the case that an arbitrary external subscriber terminal 11 makes a call to an arbitrary wired phone number through the PSTN 10, the wired exchange 111 is called the corresponding wired phone number through the PSTN 10 and determines whether the called phone number is the wired subscriber number or not (S31). As a result of the determination, in the case that the called phone number is the wired subscriber number, it is transferred to the mobile gateway 112 through the wired subscriber circuit (S32). On the other hand, in the case that the called phone number is not the wired subscriber number as a result of the determination, the virtual subscriber circuit distributed to the wireless terminal is selected and transferred to the mobile gateway 112 (S33).

The mobile gateway 112 analyzes a phone number transferred from the wired exchange 111. At this time, the mobile gateway 112 has the database 112b shown in FIG. 4. The mobile gateway 112 determines whether the corresponding phone number in the database is a multiple terminating number or not (S34). As a result of the determination, in the case that the corresponding phone number is not the multiple terminating number, since it is the case of only the wired phone terminal being called, the call is distributed to the wired subscriber (S35). On the other hand, as a result of the determination in S34, in the case that the corresponding phone number is the multiple terminating number, the call is distributed to the wired subscriber at first (S36). Next, the mobile gateway 112 requests a virtual number to the pBSC 113, and the virtual number for the corresponding wired phone number is provided from the pBCS 113 and the call is distributed to the corresponding wireless terminal 220 through the pBSC 113 and pBTS 210 (S37). On the other hand, in the case that the mobile gateway 112 receives the wired phone number through the virtual subscriber circuit distributed to the wireless terminal, it distributes the call to the corresponding wireless terminal through the pBSC 113 and pBTS 210.

Next, in the case that at least one of the wired terminal 250 and the wireless terminal 220 responds in the mobile zone 200, the call is processed according to the response, and it is, otherwise, determined whether there exists the subscriber in the mobile zone 200 (S38). In the case that there does not exist the subscriber in the mobile zone 200 as the response of the wired terminal or wireless terminal does not exist in the mobile zone 200, the mobile gateway 112 makes a call to the wireless terminal 50a in the public mobile communication network through the BTS 50 in the public mobile communication network by way of the wired exchange 111 and the PSTN 10 and CDMA network 20. On the other hand, in the case that there is no response even when the subscriber exists in the mobile zone 200, a voice information message such as "Please call again since the subscriber is not available now" may be transmitted (S40).

The Second Embodiment

Figure 12:
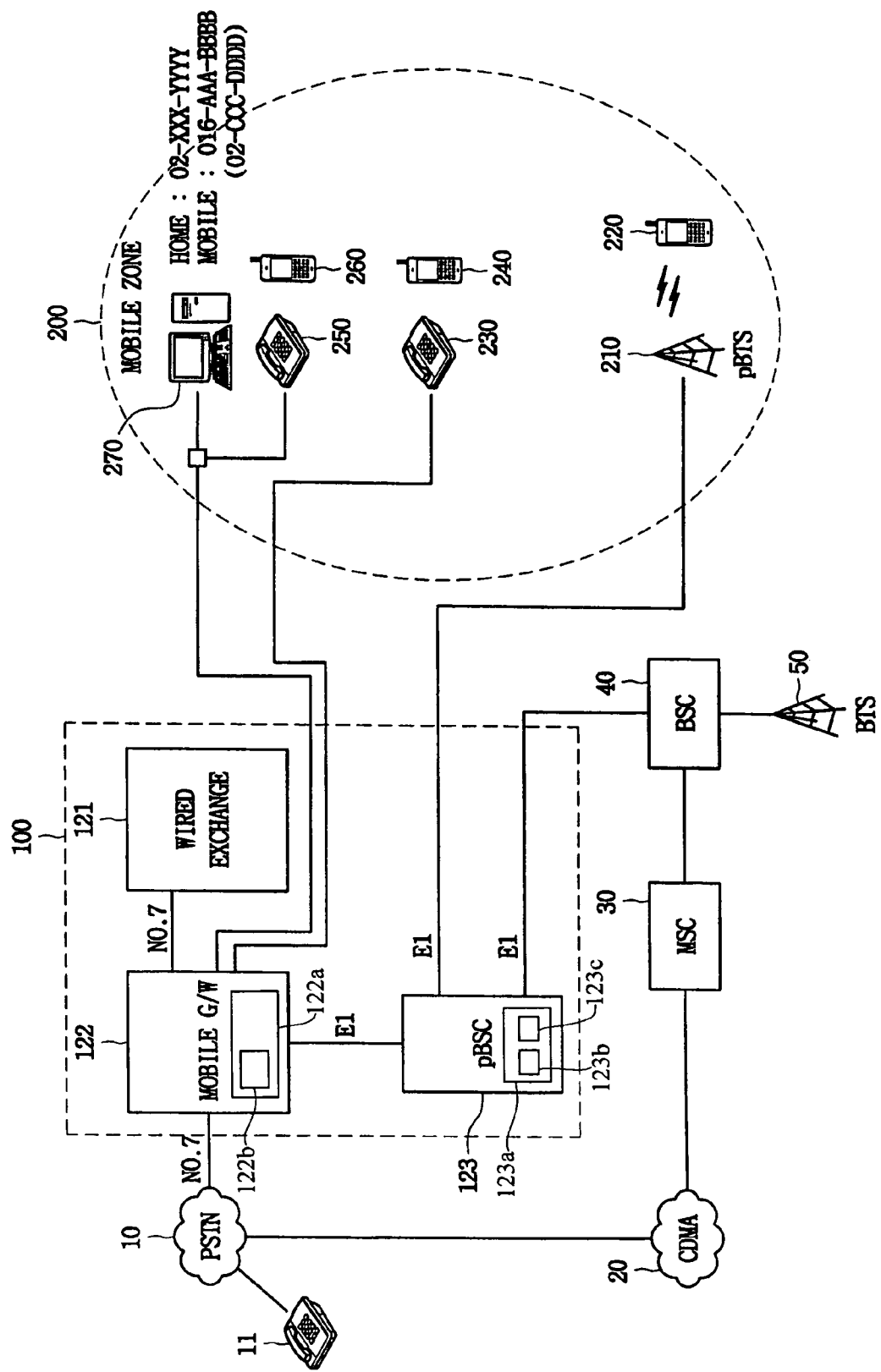
FIG. 12 is a system block diagram for explaining a concept of a system for interconnecting wired and wireless phone services in accordance with another embodiment of a wired and wireless interconnecting apparatus shown in FIG. 2.

FIG. 12 is a system block diagram for explaining a concept of a system for interconnecting wired and wireless phone services in accordance with another embodiment of a wired and wireless interconnecting apparatus shown in FIG. 2.

Referring to FIG. 12, the wired and wireless interconnecting apparatus 100 includes a wired exchange 121, a mobile gateway 122 and a pBSC 123.

Since an explanation for the mobile zone 200 including the pBTS 210 in the drawing was previously provided, it may be omitted.

The embodiment is an example that the mobile gateway 122 is used as an exchange for Tandem and the PSTN 10 is connected to a trunk of the mobile gateway 122 through NO.7 signaling.

The wired exchange 121 is a system providing subscribers except the mobile zone 200 with a service of the wired phone network, and the mobile gateway 122 is a system processing a call generated to the wired and wireless subscribers in the mobile zone 200.

That is, the mobile gateway 122 performs a process of the call for the wired phone network service and the mobile communication service to the wired and wireless subscribers 220 to 270 in the mobile zone 200, and the wired exchange 121 is a system providing a wired subscriber (not shown) except the mobile zone 200 with the wired phone service.

For example, in the case that a telephone station is installed for a large scale of an apartment complex, there may exist a wired and wireless subscriber who resides in an apartment complex located in the mobile zone 200 where the pBTS 210 is installed and the mobile communication service can be provided by the pBTS 210, and a wired phone service subscriber who resides in an apartment complex located outside the mobile zone 200 where the pBTS 210 is not installed and so the mobile communication service cannot be provided, and only general wired phone service can be provided.

In the case of the large scale apartment complex, as the number of the subscriber is increased, there is a case that it is not permitted to provide a subscriber in the mobile zone 200 and a subscriber outside the mobile zone 200 in one mobile gateway 122 with a wired phone service due to a capacity of an exchange.

Accordingly, in the case of the wired and wireless phone subscriber in the mobile zone 200, the corresponding communication service is provided by the mobile gateway 122, and in the case of the subscriber outside the mobile zone 200, the corresponding communication service is provided by the separate wired exchange 121.

Therefore, in the case that there is a call to an arbitrary wired phone number through the PSTN 10, the mobile gateway 122 determines whether the phone number is an incoming call for its extension subscriber. In addition, as a result of the determination, in the case that the phone number is not the extension incoming call, for example, a subscriber phone number outside the mobile zone 200, it is a Tandem call, and this call is transferred to the wired exchange 121 and then the corresponding service is provided in the wired exchange 121.

The pBSC 123 connects the mobile gateway 122 to the pBTS 210, and is also connected to the BSC 40 of the public mobile communication network for the general public mobile communication service.

That is, in the case that the mobile gateway 122 assigns the wired phone number with respect to an arbitrary subscriber for the wired phone service, it directly connects the SLC interface to which the wired phone number is assigned to the wired phone terminal 250 through a telephone line. Accordingly, in the case that the wired phone terminal 250 hooks off its receiver for a speech, it hears a dial tone provided in the mobile gateway 122.

Also, as the mobile gateway 122 provides its extension subscriber with the wired phone service, each subscriber can be assigned the wired phone number to the extent that the SLC interface can afford it.

Here, the wired phone number may be a general phone number which is connected to the wired phone terminal 250 in its end, and may be a virtual wired phone number which is not connected to the wired phone terminal 250 and is assigned only the phone number.

On the other hand, the mobile gateway 122 is connected to the pBSC 123 through an E1 signaling, and performs a function to interconnect a mobile communication service of the pBSC 123.

For doing that, the mobile gateway 122 has a database 122b (included in for example a memory 122a) for the wired phone number. That is, this database 122b stores information indicating whether each phone number is a virtual phone number, and whether each phone number has been registered in the multiple terminating service.

For example, when a field indicating whether each phone number is a virtual phone is established with 0, it means that the phone number is a wired phone number connected to the wired terminal, and when the field is filled with 1, it means that the phone number is a virtual phone number of the wireless terminal.

On the other hand, when a field indicating whether the multiple terminating service is established is filled with 0, it means that the service is restricted to an existing service which makes a call to the wired terminal corresponding to the corresponding wired phone number, and when the field is filled with 1, it means that the service is registered in a service which can perform the multiple terminating service.

Accordingly, in the case that an arbitrary wired phone number to which the multiple terminating service is registered is called, the mobile gateway 122 requests its information to the pBSC 123 as detailed information on the virtual wired phone number which corresponds to a wireless terminal to be called simultaneously with the wired phone number is needed.

When information on the virtual phone number of the wireless terminal connected to the corresponding wired phone number is received from the pBSC 123, the corresponding virtual phone number is found in its database and the wireless terminal corresponding to its virtual phone number is called through the pBSC 123 and pBST 210.

On the other hand, the mobile gateway 122 transfers the outgoing number and a caller ID of the wireless terminal which is received from the corresponding wireless terminal, and makes a call to the subscriber of the corresponding outgoing number, when the mobile gateway 122 receives outgoing service request from an arbitrary terminal through the pBSC 123.

At this time, the caller ID of the wireless terminal transferred to the mobile gateway 122 becomes the virtual wired phone number (for example, 02-CCC-DDDD) with which its wireless terminal is endowed.

Here, the subscriber of the outgoing call may be an internal subscriber of the mobile gateway 122, and an external subscriber who can be called through the PSTN 10.

The pBSC 123 performs functions corresponding to the BSC in the public mobile communication system, that is, a wireless link control and a handoff.

The pBSC 123 controls the pBTS 210 to perform a call process of the subscriber in order to support the public mobile communication network and private mobile communication network services and an analysis of the supplementary service, and to process all sorts of interfaces for interconnecting to the mobile gateway 122.

For doing that, in the case of receiving a private mobile communication service, the wireless terminal subscriber adds identification information established in advance to the outgoing phone number in order to discriminate the services.

Accordingly, the pBSC 123 discriminates whether the outgoing call requires a public mobile communication service or a private mobile communication service using this identification information.

That is, it is determined whether the outgoing call of the wireless terminal transferred from the pBTS 210 is the outgoing call requesting the public mobile communication service or the outgoing call requesting the private mobile communication service, and the outgoing call is transparently bypassed to the BSC 40 of the public mobile communication network when it is a public mobile communication service outgoing call, and the outgoing call is transferred to the mobile gateway 122 to provide the private mobile communication service when it is the private mobile communication service outgoing call.

For example, when a user input a phone number "#212" through the wireless terminal, it is determined that the pBSC 123 wishes to use a private mobile communication service since it includes an identifier "#" indicating that the user wishes to use the private mobile communication service, and a speech request signal including a phone number "212" is transmitted to the mobile gateway 122 and it is possible to talk to an extension subscriber of "212".

When the user inputs a phone number "#02-212-8866", the pBSC 123 determines that the user wishes to use the private mobile communication service since the number includes an identifier '#' indicating that the user wishes to use the private mobile communication service, and the pBSC 123 transmits a speech request signal including a phone number "02-212-8866" to the mobile gateway 122 and makes it possible for speech to a public phone network subscriber of "02-212-8866" through the PSTN 10.

When the user inputs a phone number "#016-212-8866", the pBSC 123 determines that the user wishes to use a private mobile communication service since the number includes an identifier '#' indicating that the user wishes to use the private mobile communication service, and the pBSC 123 transmits a speech request signal including the phone number "016-212-8866" to the mobile gateway 122 and makes it possible to speech to a public mobile communication service subscriber of "016-212-8866" through the public mobile communication network by way of the PSTN 10. Identifiers other than '#' can also be used.

The pBSC 123 includes a MIN number (for example, 016-AAA-BBBB) with which a public mobile communication network has endowed in an arbitrary wireless terminal, and a database 123b (included for example in memory 123a) with respect to a virtual wired phone number (for example, 02-CCC-DDDD) with which its wireless terminal was endowed, as shown in FIG. 5.

That is, the database stores information indicating whether a virtual wired number exists in each of the MIN numbers of an arbitrary wireless terminal, and its wired number information in the case that there is the corresponding virtual wired number.

For example, when a field indicating whether there is a virtual wired number is established with 0, it means that there is no virtual wired number, and when the field is established with 1, it means that there is a virtual wired number corresponding to the MIN number and the virtual wired number corresponding to it is stored.

Accordingly, even in the case that the virtual wired phone number in the mobile gateway 122 is called, it is possible to call the corresponding wireless terminal.

On the other hand, when an arbitrary wireless terminal requests an outgoing service through the pBTS 210, it can be divided into two cases in large part.

Firstly, there may be a case that an outgoing is requested using a private mobile communication service. In this case, as the MIN number with which a public mobile communication network was endowed is loaded using a caller ID transferred from the pBTS 210, the caller ID is transformed into a virtual wired phone number with reference to the database 123b shown in FIG. 5, and sent to the mobile gateway 122.

In the case of not using the private mobile communication service, as the MIN number with which the public mobile communication network was endowed is carried using a caller ID transferred from the pBTS 210, the caller ID is transferred to the BSC 40 of the public mobile communication network as it is.

Also, the pBSC 123 manages a database 123c (included for example in memory 123a) for the multiple terminating services. That is, the pBSC 113 manages the database with respect to a wired phone number (for example, 02-XXX-YYYY) whose multiple terminating function among the wired phone terminals installed in a house is established and the virtual wired phone number with which the wireless terminal was simultaneously endowed when calling the corresponding wired phone number. The database 123c can also be combined into database 123b.

Accordingly, in the case that the mobile gateway 122 queries a virtual wired phone number which is multiply established with respect to the wired phone number (for example, 02-XXX-YYYY) which was registered in the multiple terminating service, a virtual phone number (02-CCC-DDDD) which is linked to the wired phone number is found by searching for the corresponding wired phone number (for example, 02-XXX-YYYY) in the database, and a response can be made to the mobile gateway 122.

That is, databases (122b and 123c) are constructed in each of the mobile gateway 122 and pBSC 123 for the multiple terminating services. The database 122b which is constructed in the mobile gateway 122 stores information on whether an arbitrary wired phone number is multiply terminated and the virtual wired phone number with which each wireless terminal was endowed.

On the other hand, the database 123c which is constructed in the pBSC 123 stores information on an arbitrary wired phone number in which a multiple terminating function is established and a virtual wired phone number of the wireless terminal which will be called in the multiple terminating in the wired phone number.

In the wired and wireless interconnecting apparatus 100 constructed as described above, it is possible not only to make the wired phone service with respect to the wired phone terminal, but also to terminate a call to an assigned wired terminal when making a call of the virtual wired phone. Additionally, it is possible to make both wired and wireless calls simultaneously in the mobile gateway 122 when the wired phone is called, and terminate the call to a desired terminal.

In the case that a call for the virtual wired phone is made in the PSTN 10, the mobile gateway 122 makes a call to the wireless terminal in the mobile zone 200 through the pBSC 123 and pBTS 210 corresponding to the virtual wired phone number.

When an incoming call response comes from the wireless terminal, the call is connected. When the incoming call response does not come, the service is ended according to a wired phone service process.

Figure 13:
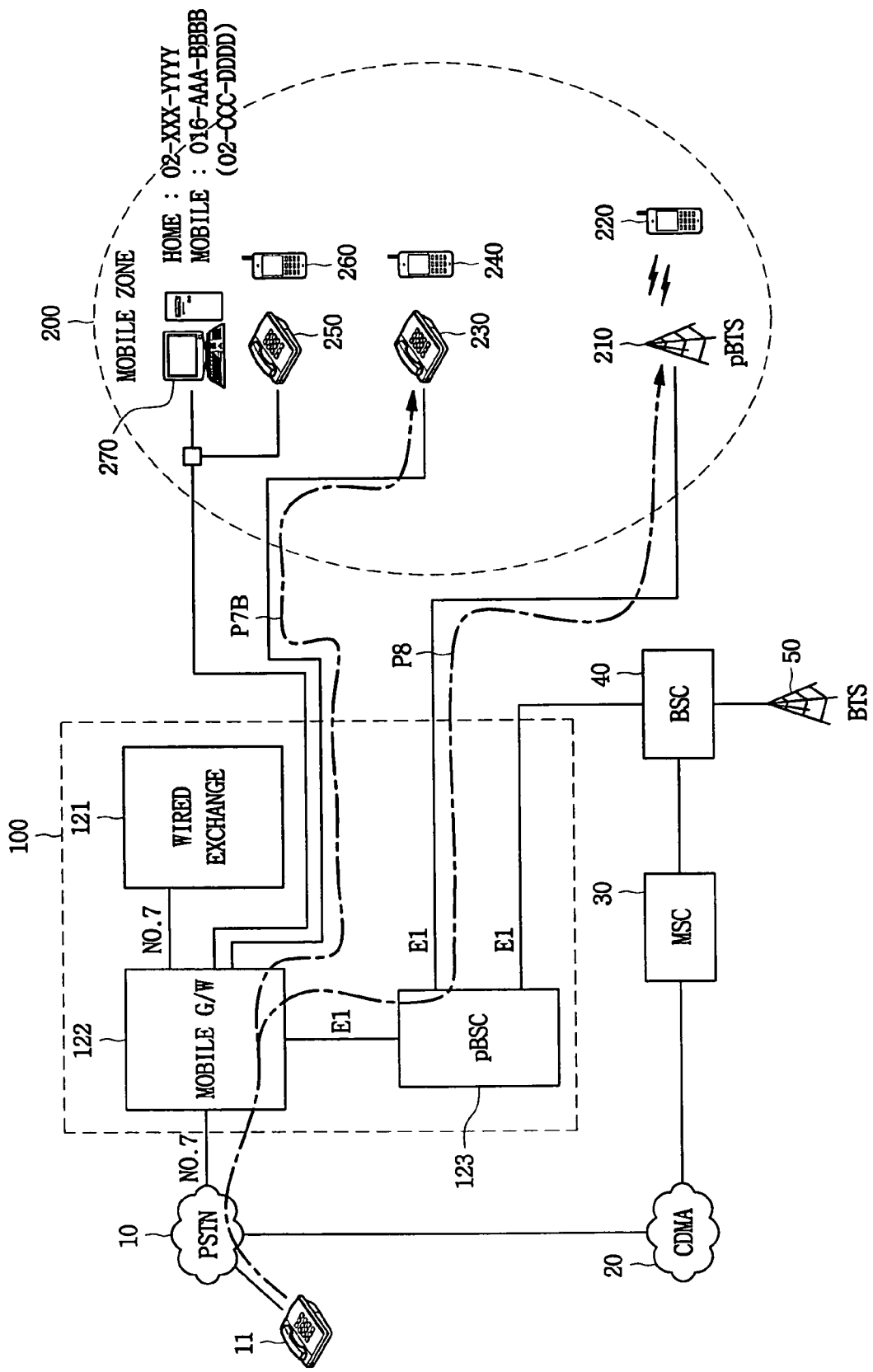
FIG. 13 is a network flow chart showing a process in which a wired phone and a wireless terminal are simultaneously called when a wired phone is called.
Figure 14:
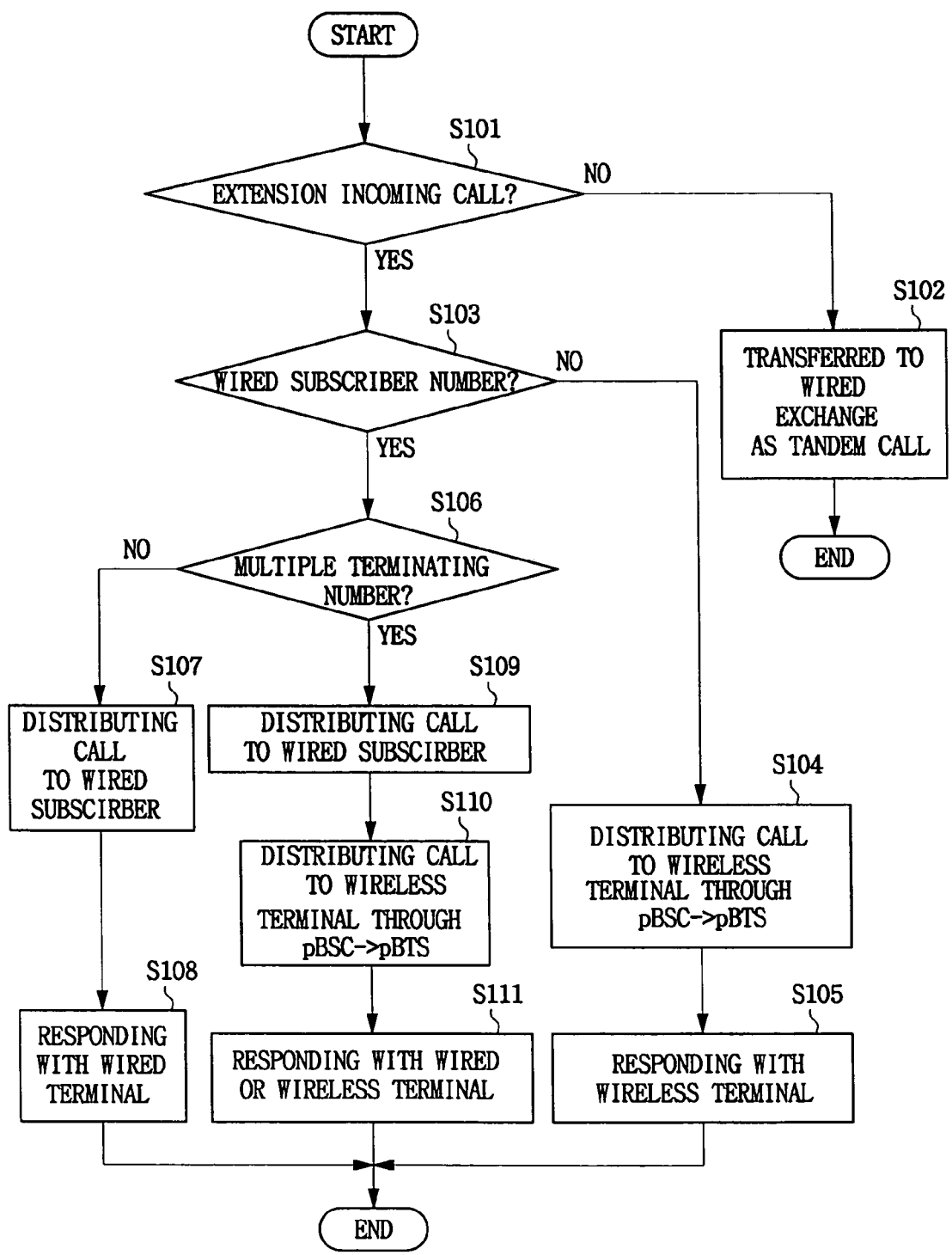
FIG. 14 is a flow chart in which the wired phone and wireless terminal are simultaneously called when the wired phone is called in FIG. 13.

FIGS. 13 and 14 are diagrams showing a process in which a wired phone and a wireless terminal are simultaneously called when a wired phone is called.

With reference to incoming call paths (P7B, P8) shown in FIG. 13 and a flow chart shown in FIG. 14, an incoming process will be explained.

In the case that an arbitrary subscriber terminal 11 makes a call to an arbitrary wired phone number through the PSTN 10, the mobile gateway 122 receives the corresponding wired phone number through the PSTN 10 and determines whether the called phone number is an incoming call number for an extension subscriber in the mobile gateway 122 (S101). As a result of the determination, in the case that the called phone number is not the extension incoming call, it is a Tandem call and is transferred to the wired exchange 121 (S102). On the other hand, in the case that the called phone number is an extension incoming call, the mobile gateway 122 analyzes the phone number transferred from the PSTN 10. At this time, the mobile gateway 122 realizes whether the corresponding phone number is a wired phone number, and whether the corresponding phone number is a multiple terminating number through the database 122*b* shown in FIG. 4.

First of all, it is determined whether the corresponding phone number is a wired subscriber phone number (S103). In case that the corresponding phone number is not the wired subscriber number, the phone number is a wireless subscriber number so that a virtual number is requested from the pBSC 123 and the virtual number is provided by the pBSC 123. In addition, a call is distributed to the corresponding wireless terminal 220 through the pBSC 123 and pBTS 210 (S104). Then, the corresponding wireless terminal 220 responds to the distribution (S105).

On the other hand, as a result of the determination of step S103, in the case that the corresponding phone number is a wired subscriber number, it is determined whether the subscriber number is a phone number which is established for the wired and wireless multiple terminating (S106). As a result of the determination of step S106, in the case that the subscriber number is not the multiple terminating number, the call is distributed to the wired subscriber (S107). Accordingly, the wired terminal 250 responds to the distribution (S108). However, in the case of the multiple terminating number, the call is distributed to the wired subscriber at first (S109). Moreover, the virtual number is requested to the pBSC 123 and the virtual number is provided from the pBSC 123, and the call is distributed to the corresponding wireless terminal 220 through the pBSC 123 and pBTS 210 (S110). Then, one of the wired terminal 250 and the wireless terminal 220 responds to the distribution, accordingly (S111).

Figure 15:
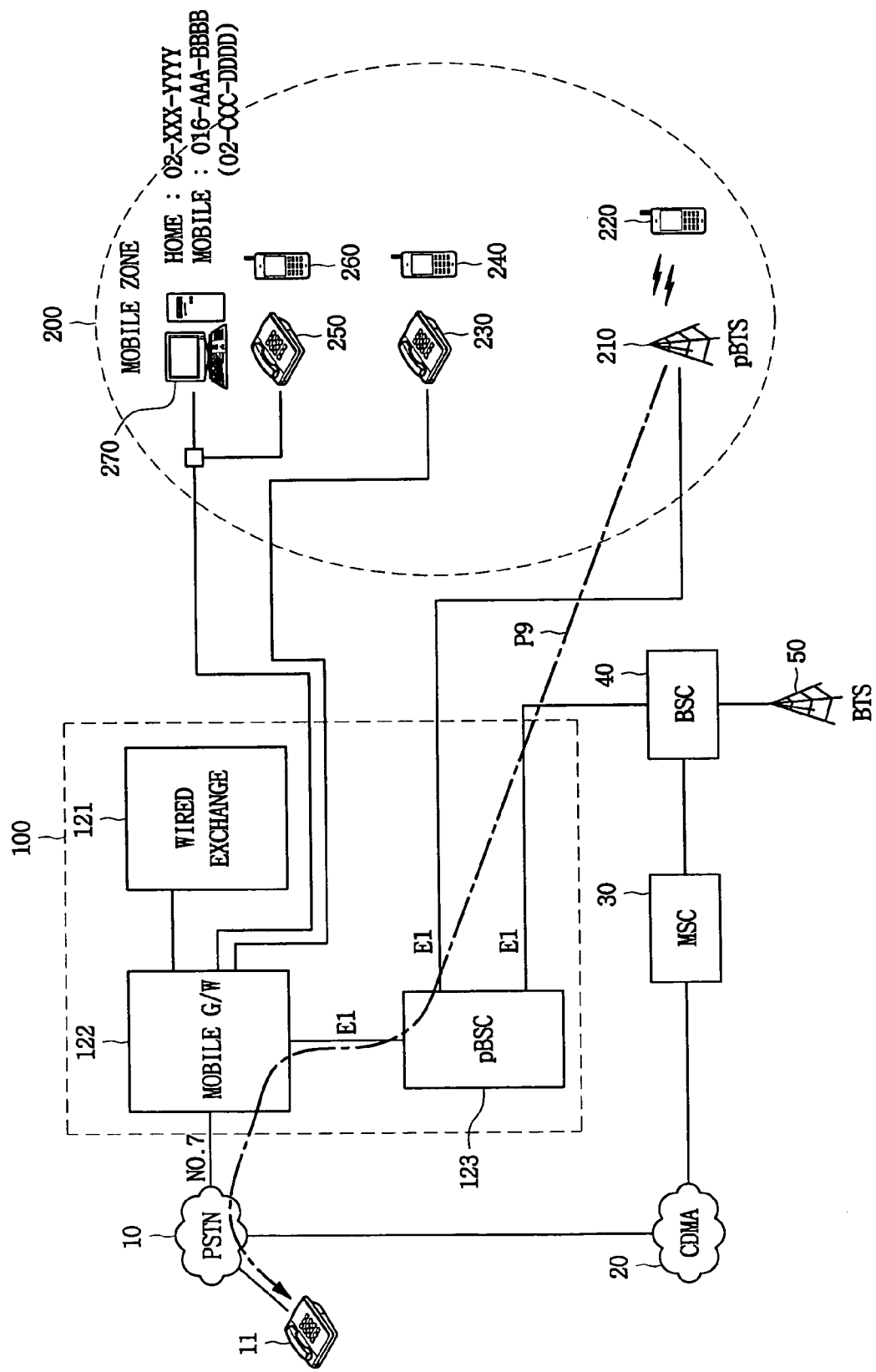
FIG. 15 is a diagram showing a process of making a call to an external subscriber by a wireless terminal subscriber.
Figure 16:
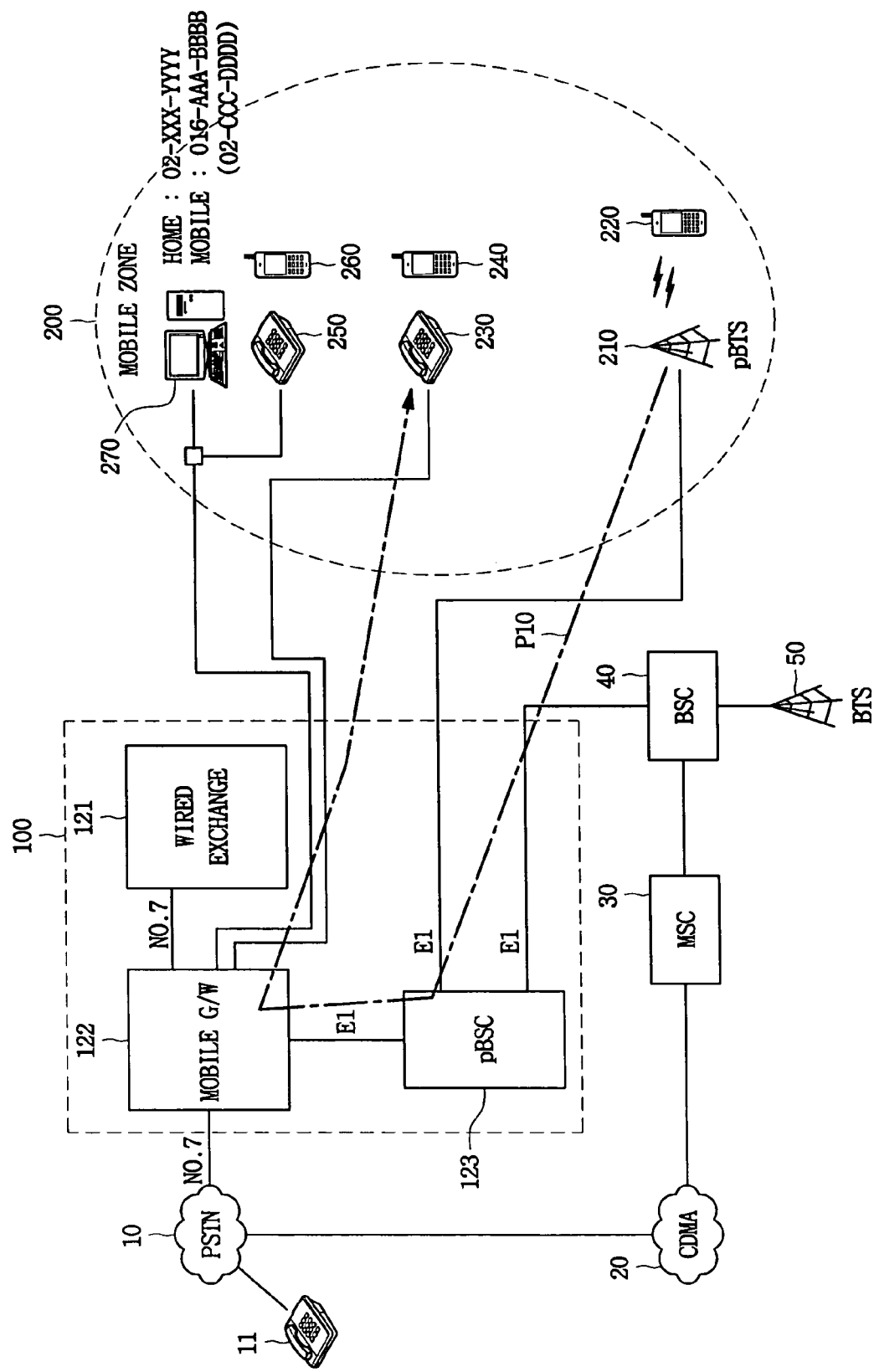
FIG. 16 is a diagram showing a process of making a call to an internal subscriber by a wireless terminal subscriber.
Figure 17:
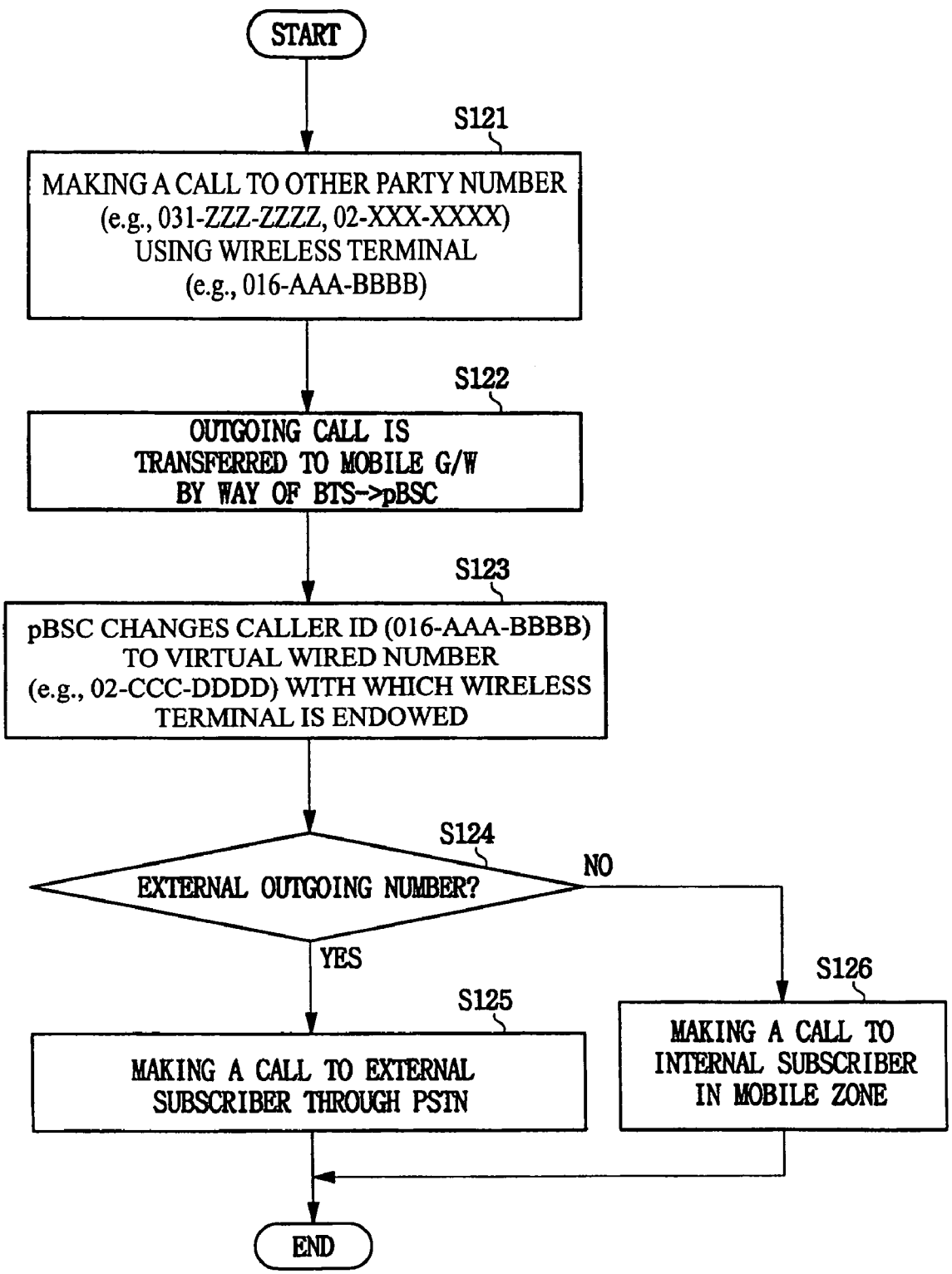
FIG. 17 is a flow chart showing a process of making a call to the external subscriber or internal subscriber by a wireless terminal subscriber in FIGS. 15 and 16.

FIG. 15 is a diagram showing a process of making a call to an external subscriber by a wireless terminal subscriber, FIG. 16 is a diagram showing a process of making a call to an internal subscriber by a wireless terminal subscriber, and FIG. 17 is a flow chart showing a process of making a call to an external subscriber or internal subscriber by a wireless terminal subscriber.

With reference to an incoming call path P9 of FIG. 15 and an incoming path P10 of FIG. 16, a process of incoming call of FIG. 17 will be explained.

A number of the other's party (for example, 031-ZZZ-ZZZZ, or 02-XXX-XXXX) is called in the wireless terminal 220 (for example, 016-AAA-BBBB) (S121). An outgoing call generated in the wireless terminal 220 is transferred to the mobile gateway 122 through the pBTS 210 and pBSC 123 (S122).

At this time, the pBSC 123 changes a caller ID (016-AAA-BBBB) with which a wireless terminal is endowed into a virtual wired number (for example, 02-CCC-DDDD) with which the wireless terminal is endowed (S123).

The mobile gateway 122 determines whether the outgoing number sent from the wireless terminal is an external outgoing call number (S124). As a result of the determination in S124, in the case of the external outgoing call number, the external subscriber of the corresponding phone number is called through the PSTN 10 (S125).

On the other hand, when it was determined whether the outgoing number is the external outgoing number in the mobile gateway 122, in the case that the outgoing number is not the external outgoing number as a result of the determination, the internal subscribers 220, 240, and 260 in the mobile zone 200 are called (P10)(S126).

At this time, an accounting process is performed using accounting equipment (not shown) connected to a Tandem mobile gateway 122.

Here, a speech between the internal subscribers performed in the wired and wireless interconnecting apparatus 100 in the mobile zone 200 may not be charged and operated freely. In such a case, the subscriber can make a speech between the internal subscribers without a separate accounting.

Figure 18:
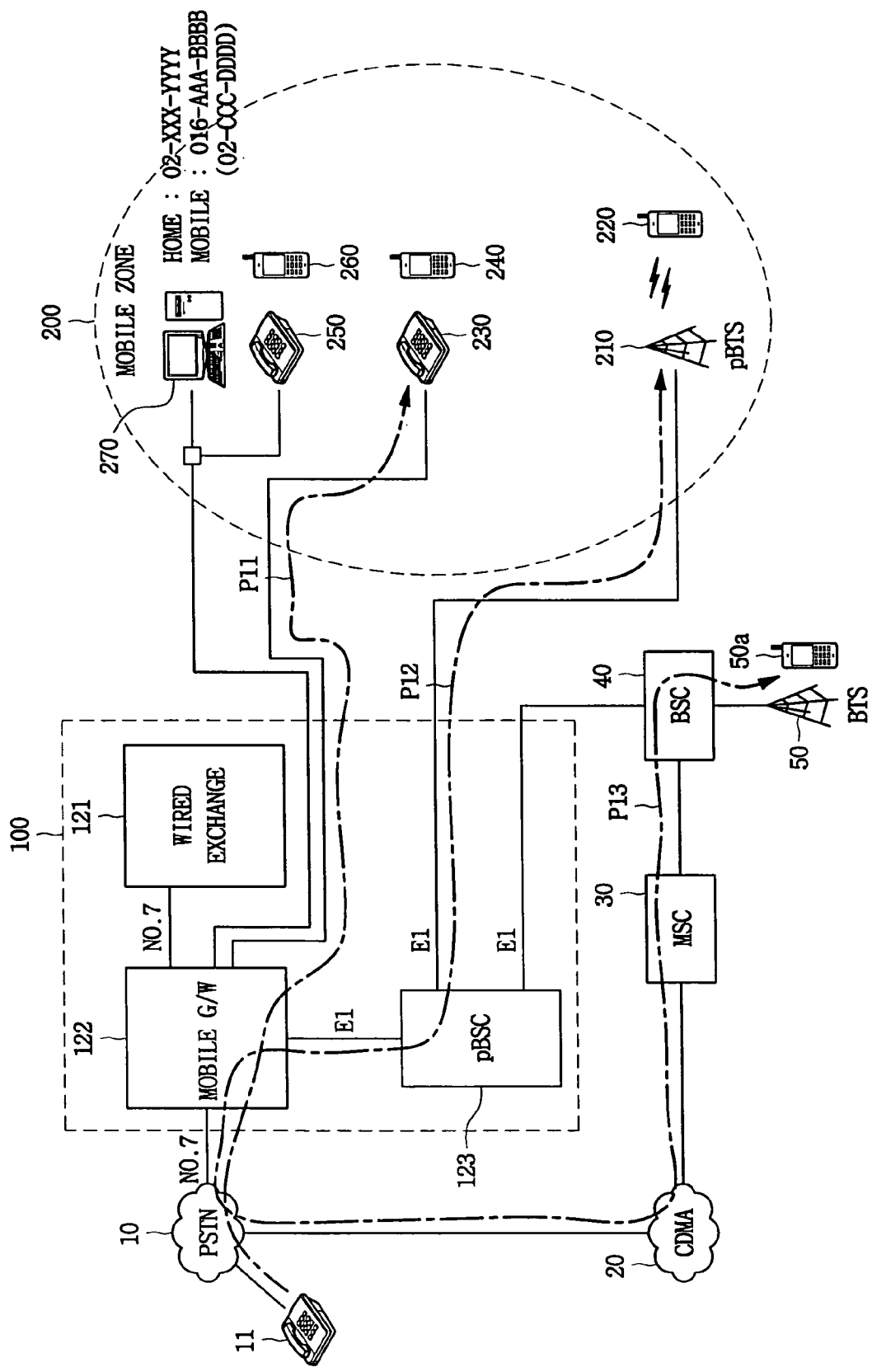
FIG. 18 is a diagram showing a process of re-routing an incoming call when a mobile zone has nothing.
Figure 19:
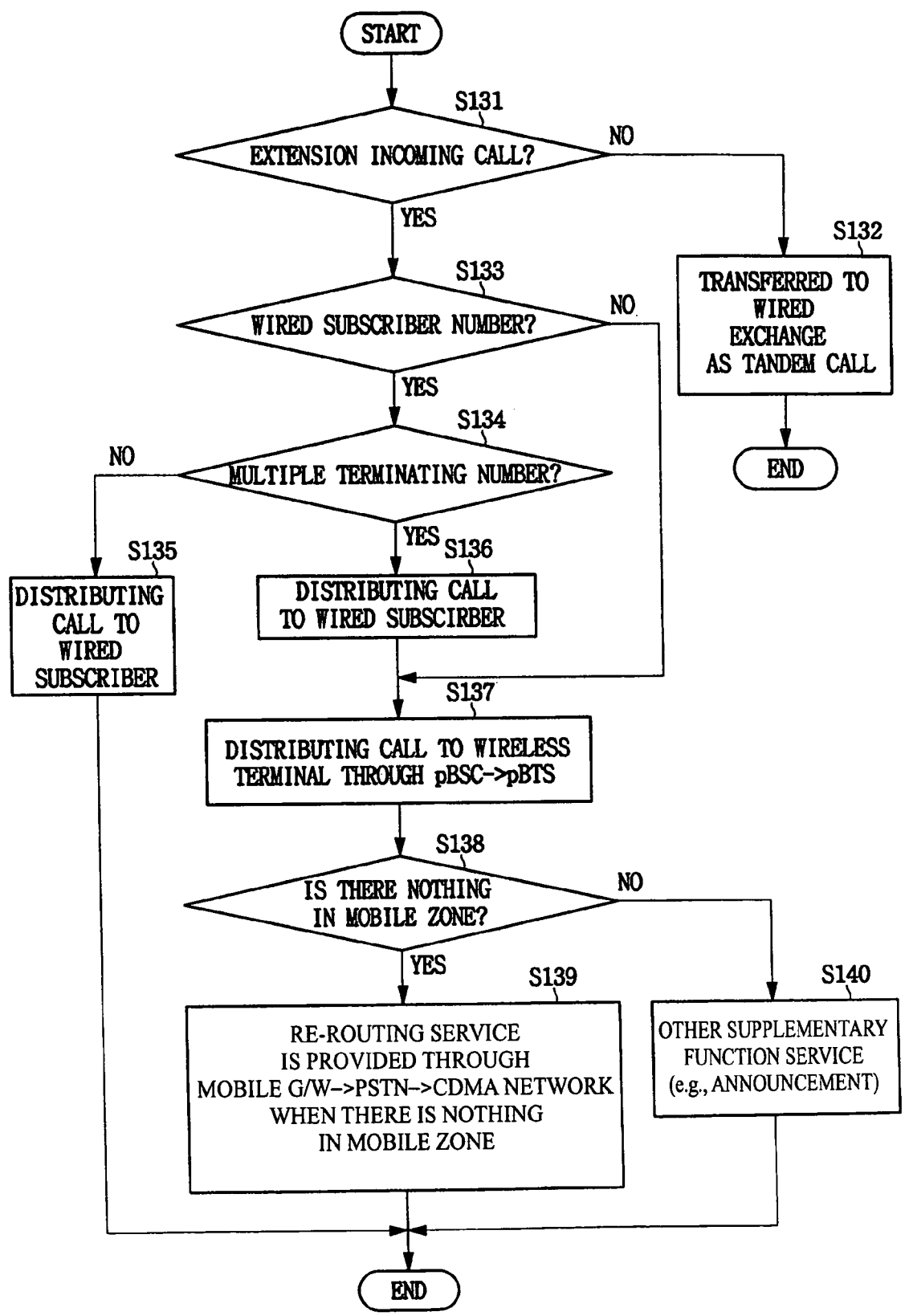
FIG. 19 is a flow chart showing a process of re-routing an incoming call when the mobile zone has nothing in FIG. 18.

FIGS. 18 and 19 are diagrams showing a process of re-routing an incoming call when a mobile zone has nothing.

With reference to incoming call paths P11, P12 and P13 of FIG. 18, a re-routing process of FIG. 19 will be explained.

In the case that an arbitrary subscriber terminal 11 makes a call to an arbitrary wired phone number through the PSTN 10, the mobile gateway 122 receives the corresponding wired phone number through the PSTN 10 and determines whether the called phone number is the incoming call number for the extension subscriber in the mobile gateway 122 (S131). As a result of the determination in S131, in the case that called phone number is not the extension incoming call number, the called phone number is a Tandem call number and transferred to the wired exchange (S132).

On the other hand, in the case that the called phone number is an extension incoming call number, the mobile gateway 122 analyzes a phone number transferred from the PSTN 10. At this time, the mobile gateway 122 realizes whether the corresponding phone number is a wired phone number, and whether the corresponding phone number is a multiple terminating number, through its database.

First of all, it is determined whether the corresponding phone number is the wired phone number (S133). As a result of the determination, in the case of the wired subscriber number, it is determined whether the wired subscriber number is a phone number which is established for a wired and wireless multiple terminating (S134). As a result of the determination, in the case that the wired subscriber number is not the multiple terminating number, the call is distributed to only the wired subscriber and this state is stayed until the corresponding wired terminal responds to the state (S135). On the other hand, as a result of the determination, in the case of the multiple terminating number, the call is distributed to the wired subscriber at first (S136). Moreover, a virtual number is requested to the pBSC 123 and the virtual number is provided from the pBSC 123, and the call is distributed to the corresponding wireless terminal 220 through pBSC 123 and pBTS 210 (S137). By the way, in the case that the mobile gateway 122 receives a wired phone number through the virtual subscriber circuit distributed to the wireless terminal, it distributes the call to the corresponding wireless terminal 220 through the pBSC 123 and pBTS 210.

Next, in the case that at least one of the wired terminal 250 and the wireless terminal 220 responds to the state in the mobile zone 200, the call is processed according to the response. In the case of no response, it is determined whether a subscriber exists in the mobile zone 200 (S138). In the case that it is determined that the subscriber does not exist in the mobile zone 200 as there is no response of the wired terminal 250 or wireless terminal 220 in the mobile zone 200, the mobile gateway 122 makes a call to the wireless terminal 50*a* in the public mobile communication network through the BTS 50 existed in the public mobile communication network using the PSTN 10 and CDMA network 20 (S139). In the case that there is no response even when the subscriber exists in the mobile zone 200, a voice information message "Please call again since the subscriber is not available now" may be transmitted (S140).

The Third Embodiment

Figure 20:
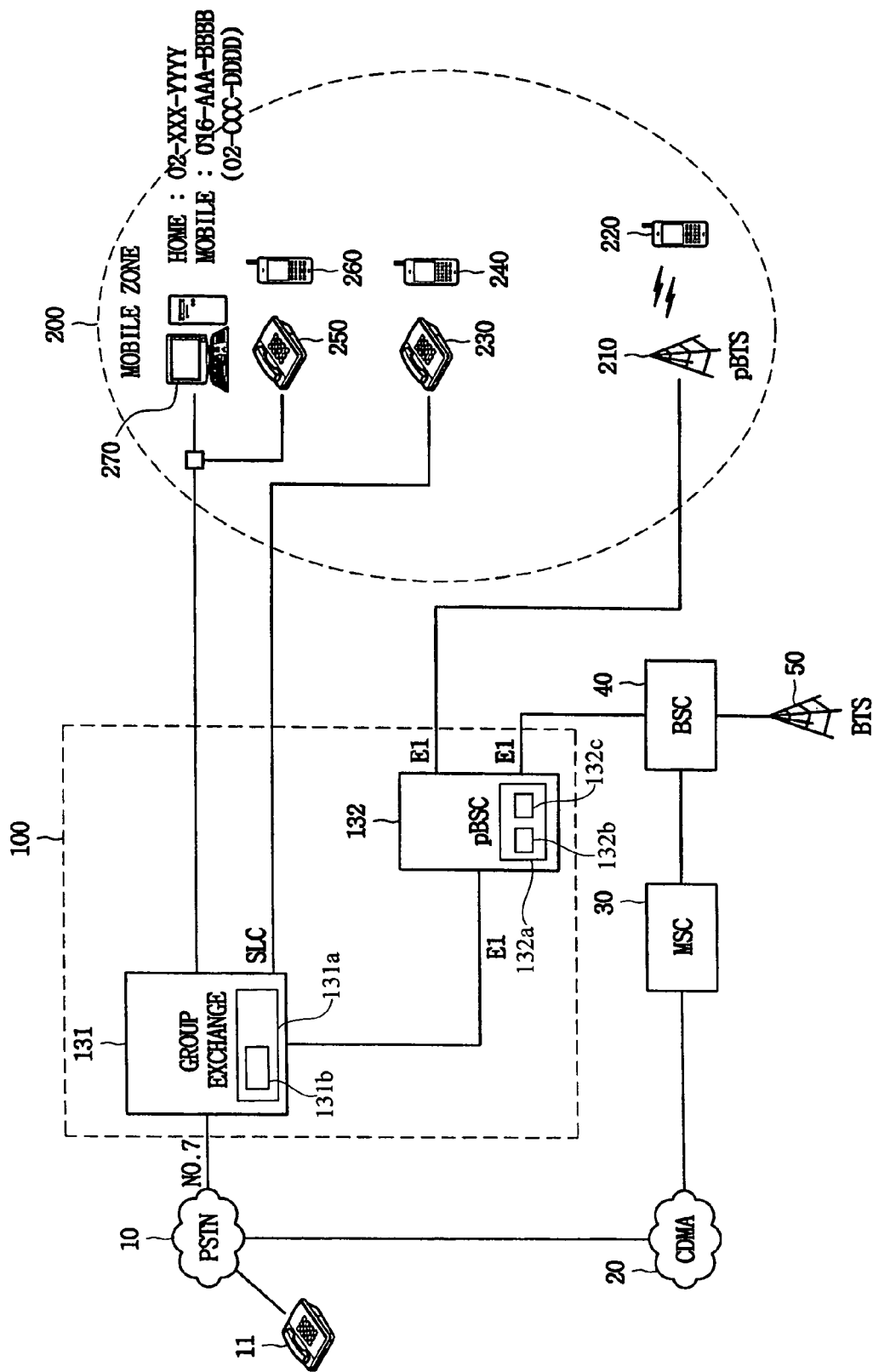
FIG. 20 is a system block diagram for explaining a concept of a system for interconnecting wired and wireless phone services in accordance with yet another embodiment of the wired and wireless interconnecting apparatus shown in FIG. 2.

FIG. 20 is a system block diagram for explaining a concept of a system for interconnecting wired and wireless phone services in accordance with yet another embodiment of a wired and wireless interconnecting apparatus shown in FIG. 2.

Referring to FIG. 20, the wired and wireless interconnecting apparatus 100 includes a group exchange 131 performing a wired exchange function and a mobile gateway function, and a private base station controller pBSC 132.

Since an explanation for the mobile zone 200 including the pBTS 210 in the drawing was previously provided, it may be omitted.

The group exchange 131 is a system performing a call process of wired phone network and mobile communication services for wired and wireless subscribers 220 to 270 in the mobile zone 200, and providing subscribers (not shown) outside the mobile zone 200 with a wired phone service.

For example, in the case that the exchange is installed in a small sized apartment complex, the pBTS 210 is installed and the wired and wireless phone interconnecting service is provided to the wired and wireless subscribers who reside in an apartment placed in the mobile zone 200 which is provided with the wireless service by the pBTS 210, and the general wired phone service is provided to the wired phone service subscribers who reside in an apartment placed outside the mobile zone 200 which is not provided with the mobile communication service by the BTS210.

The pBSC 132 connects the group exchange 131 to the pBTS 210, and is connected to the BSC 40 of the public mobile communication network for a general public mobile communication service.

In the embodiment, functions of the mobile gateway and wired exchange are embodied in one group exchange 131, wherein the PSTN 10 is connected to a trunk of the group exchange 131 through the NO. 7 signaling.

The wired exchange 111 is connected to each of the wired phone terminals 230, 250 and 270 through the extension Subscriber Line Card (SLC) interface using a telephone line.

That is, in the case that the group exchange 131 assigns the wired phone number to an arbitrary subscriber for the wired phone service, the SLC interface to which the wired phone number is assigned is directly connected to the wired phone terminal 250 of the subscriber through the telephone line. Accordingly, the wired phone terminal 250 hears a dial tone provided by the group exchange 131 when a receiver is hooked off for a speech.

Also, as the group exchange 131 provides its extension subscriber with the wired phone service, the wired phone number is assigned to each subscriber to the extent that the SLC interface can afford it.

Here, the wired phone number may be a general phone number which is connected to the wired phone terminal 250 in its end, and may be a virtual wired phone number which is not connected to the wired phone terminal 250 and is assigned only a phone number.

On the other hand, the group exchange 131 is connected to the pBSC 132 through an E1 signaling, and performs a function to interconnect a mobile communication service of the pBSC 132.

For doing that, the group exchange 131 has a database 131b (included in memory 131a for example) for the wired phone number. That is, this database 131b stores information indicating whether each phone number is a virtual phone number, and whether each phone number has been registered in the multiple terminating service, as shown in FIG. 4.

For example, when a field indicating whether each phone number is the virtual phone is established with 0, it means that the phone number is a wired phone number connected to the wired terminal, and when the field is filled with 1, it means that the phone number is a virtual phone number of the wireless terminal.

On the other hand, when a field indicating whether the multiple terminating service is established is filled with 0, it means that the service is restricted to an existing service which makes a call to the wired phone terminal corresponding to the corresponding wired phone number, and when the field is filled with 1, it means that the service is registered in a service which can perform the multiple terminating service.

Accordingly, in the case that an arbitrary wired phone number to which the multiple terminating service is registered is called, the group exchange 131 requests its information to the pBSC 132 as detailed information on the virtual wired phone number which corresponds to a wireless terminal to be called simultaneously with the wired phone number is needed.

When the information on the virtual phone number of the wireless terminal connected to the corresponding wired phone number is received from the pBSC 132, the corresponding virtual phone number is found in its database and the wireless terminal corresponding to its virtual phone number is called through the pBSC 132 and pBST 210.

On the other hand, the group exchange 131 transfers the outgoing number and a caller ID of the wireless terminal received from the corresponding wireless terminal and makes a call to the subscriber of the corresponding outgoing number, the group exchange 131 receives outgoing service request from an arbitrary terminal through the pBSC 132.

At this time, the caller ID (identification) of the wireless terminal transferred to the group exchange 131 becomes the virtual wired phone number (for example, 02-CCC-DDDD) with which its wireless terminal is endowed.

Here, the subscriber of the outgoing call may be an internal subscriber of the group exchange 131, and an external subscriber who can be called through the PSTN 10.

The pBSC 132 performs functions corresponding to the BSC in the public mobile communication system, that is, a wireless link control and a handoff.

The pBSC 132 controls the pBTS 210 to perform a call process of the subscriber in order to support the public mobile communication network and private mobile communication network services and an analysis of the supplementary service, and to process all sorts of interfaces for interconnecting to the group exchange 131.

For doing that, in the case that the wireless terminal subscriber wishes to receive a private mobile communication service, the subscriber adds identification information established in advance to the outgoing phone number in order to discriminate the services.

Accordingly, the pBSC 132 discriminates whether the outgoing call requires a public mobile communication service or a private mobile communication service using this identification information.

That is, it is determined whether the outgoing call of the wireless terminal transferred from the pBTS 210 is the outgoing call requesting the public mobile communication service or the outgoing call requesting the private mobile communication service, and the outgoing call is transparently bypassed to the BSC 40 of the public mobile communication network when it is a public mobile communication service outgoing call, and the outgoing call is transferred to the group exchange 131 to provide the private mobile communication service when it is the private mobile communication service outgoing call.

For example, when a user inputs a phone number "#212" through the wireless terminal, it is determined that the pBSC 132 wishes to use a private mobile communication service since it includes an identifier "#" indicating that the user wishes to use the private mobile communication service, and a speech request signal including a phone number "212" is transmitted to the group exchange 131 and it is possible to talk to an extension subscriber of "212".

When the user inputs a phone number "#02-212-8866", the pBSC 132 determines that the user wishes to use the private mobile communication service since the number includes an identifier '#' indicating that the user wishes to use the private mobile communication service, and the pBSC 132 transmits a speech request signal including a phone number "02-212-8866" to the group exchange 131 and makes it possible to speech to a public phone network subscriber of "02-212-8866" through the PSTN 10.

When the user inputs a phone number "#016-212-8866", the pBSC 132 determines that the user wishes to use a private mobile communication service since the number includes an identifier '#' indicating that the user wishes to use the private mobile communication service, and the pBSC 132 transmits the speech request signal including the phone number "016-212-8866" to the group exchange 131 and makes it possible to speech to a public mobile communication service subscriber of "016-212-8866" through the public mobile communication network by way of the PSTN 10. Identifiers other than '#' can also be used.

The pBSC 132 includes a MIN number (for example, 016-AAA-BBBB) with which a public mobile communication network has endowed in an arbitrary wireless terminal, and a database 132b (included in a memory 132a for example) with respect to a virtual wired phone number (for example, 02-CCC-DDDD) with which its wireless terminal was endowed, as shown in FIG. 5.

That is, the database stores information indicating whether a virtual wired number exists in each of the MIN number of an arbitrary wireless terminal, and its wired number information in the case that there is the corresponding virtual wired number.

For example, when a field indicating whether there is a virtual wired number is established with 0, it means that there is no virtual wired number, and when the field is established with 1, it means that there is a virtual wired number corresponding to the MIN number and the virtual wired number corresponding to it is stored.

Accordingly, even in the case that the virtual wired phone number in the group exchange 131 is called, it is possible to call the corresponding wireless terminal.

On the other hand, when an arbitrary wireless terminal requests an outgoing service through the pBTS 210, it can be divided into two cases in large part.

Firstly, there may be a case that an outgoing is requested using a private mobile communication service. In this case, as the MIN number with which a public mobile communication network was endowed is carried using a caller ID transferred from the pBTS 210, the caller ID is transformed into a virtual wired phone number with reference to the database 132b shown in FIG. 5, and sent to the group exchange 131.

On the other hand, in the case of not using the private mobile communication service, as the MIN number with which the public mobile communication network was endowed is carried using a caller ID transferred from the pBTS 210, the caller ID is transferred to the BSC 40 of the public mobile communication network as it is.

Also, the pBSC 132 manages a database 132c (included in for example the memory 132a) for the multiple terminating services. That is, the pBSC 132 manages the database 132c with respect to a wired phone number (for example, 02-XXX-YYYY) whose multiple terminating function was established among the wired phone terminals installed in a house and the virtual wired phone number with which the wireless terminal to be simultaneously called when calling the corresponding wired phone number was endowed.

Accordingly, in the case that the group exchange 131 queries a virtual wired phone number which is multiply established with respect to the wired phone number (for example, 02-XXX-YYYY) which was registered in the multiple terminating service, a virtual phone number (02-CCC-DDDD) which is linked to the wired phone number is found by searching for the corresponding wired phone number (for example, 02-XXX-YYYY) in the database, and a response can be made to the group exchange 131.

That is, databases (131b and 132c) are constructed in each of the group exchange 131 and pBSC 132 for the multiple terminating services. The database 131b which is constructed in the group exchange 131 stores information on whether an arbitrary wired phone number is multiply terminated and the virtual wired phone number with which each wireless terminal was endowed.

On the other hand, the database 132c which is constructed in the pBSC 132 stores information on an arbitrary wired phone number in which a multiple terminating function is established and a virtual wired phone number of the wireless terminal which will be called in the multiple terminating in the wired phone number. The database 132c can be combined into database 132b.

In the wired and wireless interconnecting apparatus 100 constructed as described above, it is possible not only to make the wired phone service with respect to the wired phone terminal, but also to terminate a call to an assigned wired terminal when making a call of the virtual wired phone. Additionally, it is possible to make both wired and wireless calls simultaneously in the group exchange 131 when the wired phone is called, and terminate the call to a desired terminal.

In the case that a call for the virtual wired phone is made in the PSTN 10, the group exchange 131 makes a call to the wireless terminal in the mobile zone 200 through the pBSC 132 and pBTS 210 corresponding to the virtual wired phone number.

When an incoming call response comes from the wireless terminal, the call is connected. When the incoming call response does not come, the service is ended according to a wired phone service process.

Figure 21:
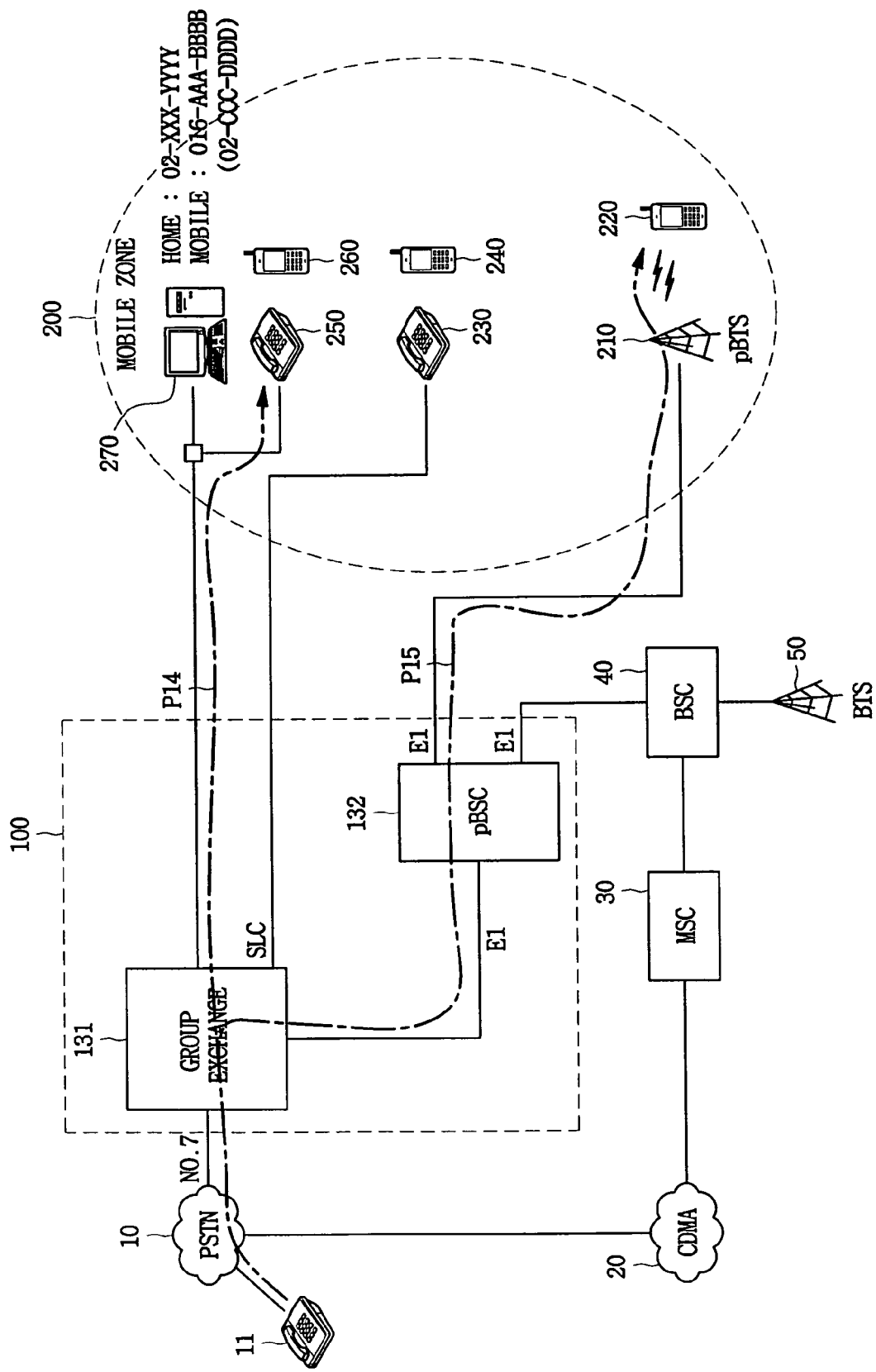
FIG. 21 is a diagram showing a process in which a wired phone and a wireless terminal are simultaneously called when a wired phone is called.
Figure 22:
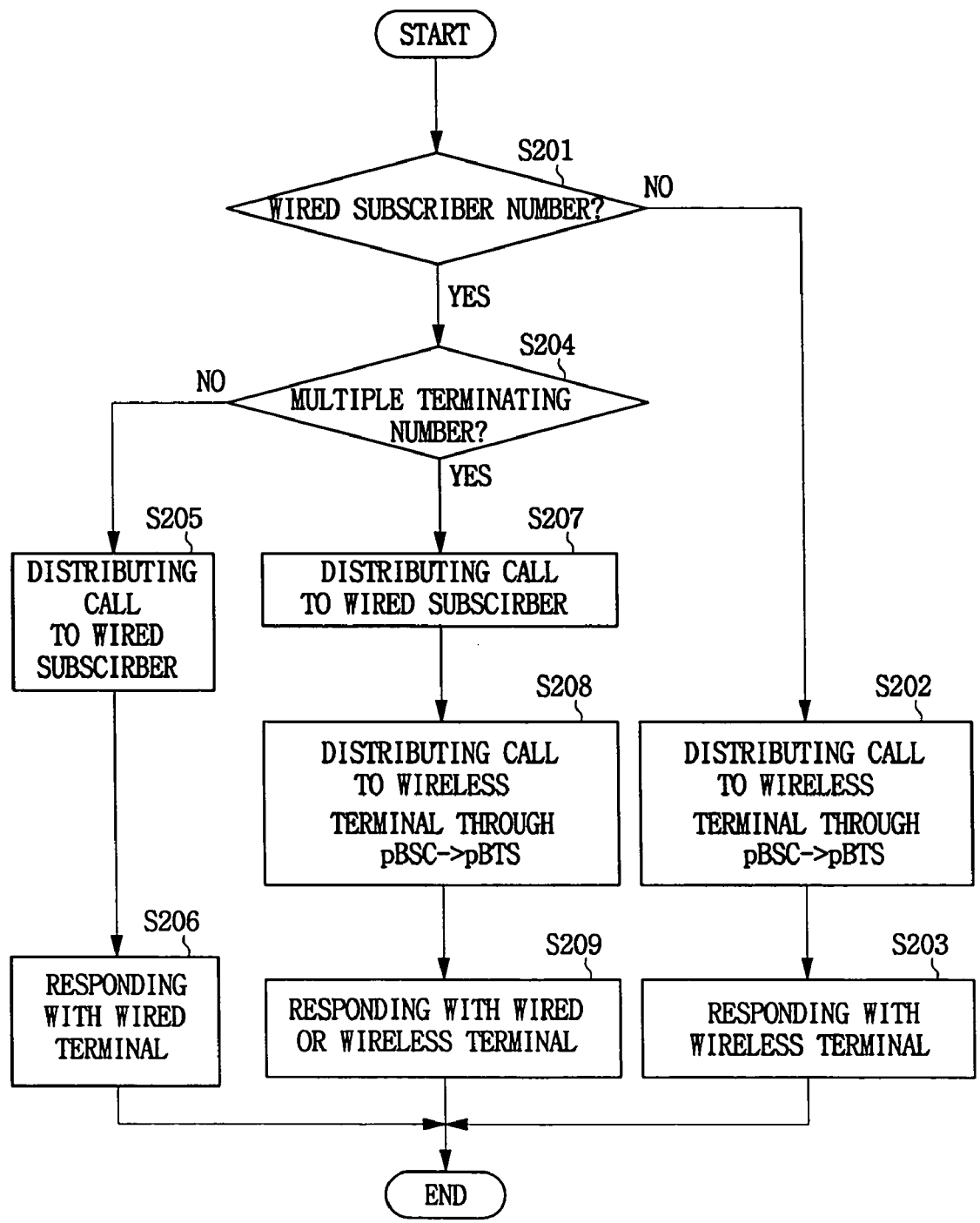
FIG. 22 is a flow chart showing a process in which wired phone and wireless terminals are simultaneously called when the wired phone is called in FIG. 21.

FIGS. 21 and 22 are diagrams showing a process in which wired phone and wireless terminals are simultaneously called when a wired phone is called.

With reference to destination paths (P14, P15) shown in FIG. 21, an incoming process will be explained.

In the case that an arbitrary subscriber terminal 11 makes a call to an arbitrary wired phone number through the PSTN 10, the group exchange 131 receives the corresponding wired phone number through the PSTN 10 and analyzes the phone number. At this time, the group exchange 131 determines whether the corresponding phone number is the wired subscriber number (S201). As a result of the determination in S201, in the case of not being the wired subscriber number, since the corresponding phone number is the wireless terminal subscriber number, the call is distributed to the corresponding wireless terminal through the pBSC 132 and pBTS 210 (S202). Accordingly, the corresponding wireless terminal 220 responds to the distribution (S203).

On the other hand, when it is determined whether the called phone number is the wired subscriber number, and in the case that the called phone number is the wired subscriber number as a result of the determination in S201, it is determined whether the corresponding phone number is the multiple terminating number in the database 131*b* shown in FIG. 4 (S204). In the case that it is determined that the corresponding phone number is not the multiple terminating number as a result of the determination in S204, the call is distributed to the wired subscriber (S205) and the wired terminal responds to the distribution (S206).

However, in the case of the multiple terminating number as a result of the determination in S204, the group exchange 131 distributes the call to the wired subscriber at first (S207)(P14). Additionally, the virtual number is requested to the pBSC 132 and a searched virtual number is received from the pBSC 132 so that a call is distributed to the corresponding wireless terminal 220 through the pBSC 132 and pBTS 210 (S208)(P15). Then, one of the wired terminal 250 and wireless terminal 220 responds to the distribution (S209). Also, the terminating service can be provided anywhere in the mobile zone 200 with the wireless terminal when the wireless terminal does not respond to the distribution.

On the other hand, when it is determined whether the corresponding phone number is the wired subscriber number (S201), in the case of not being the wired subscriber number, the call is distributed to the corresponding wireless terminal through the pBSC 132 and pBTS 210(S202) and accordingly, the corresponding wireless terminal 220 responds to the distribution (S203) as mentioned above.

Figure 23:
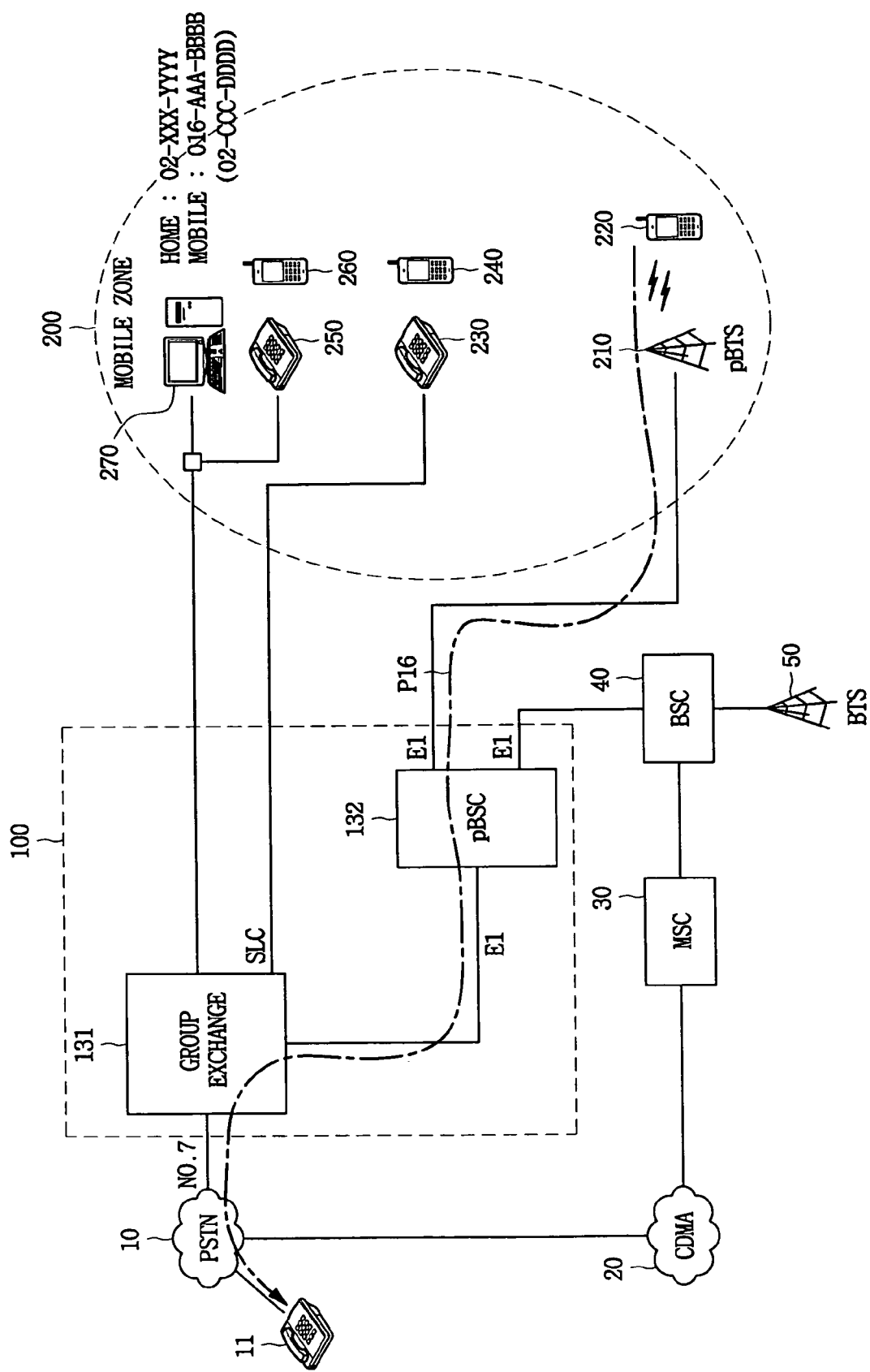
FIG. 23 is a network flow chart showing a process in which a wireless terminal subscriber makes a call to an external subscriber.
Figure 24:
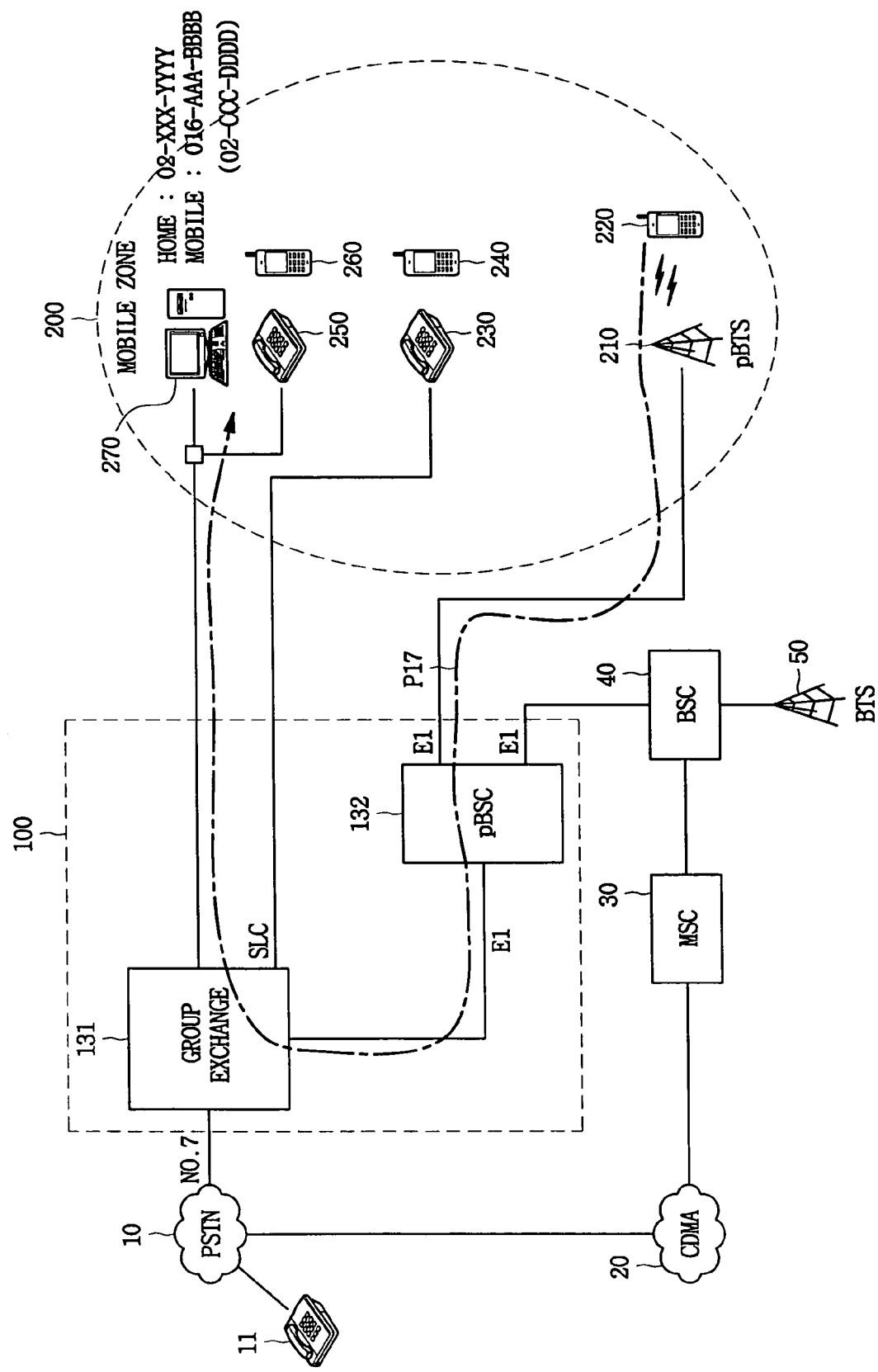
FIG. 24 is a network flow chart showing a process in which a wireless terminal subscriber makes a call to an internal subscriber.
Figure 25:
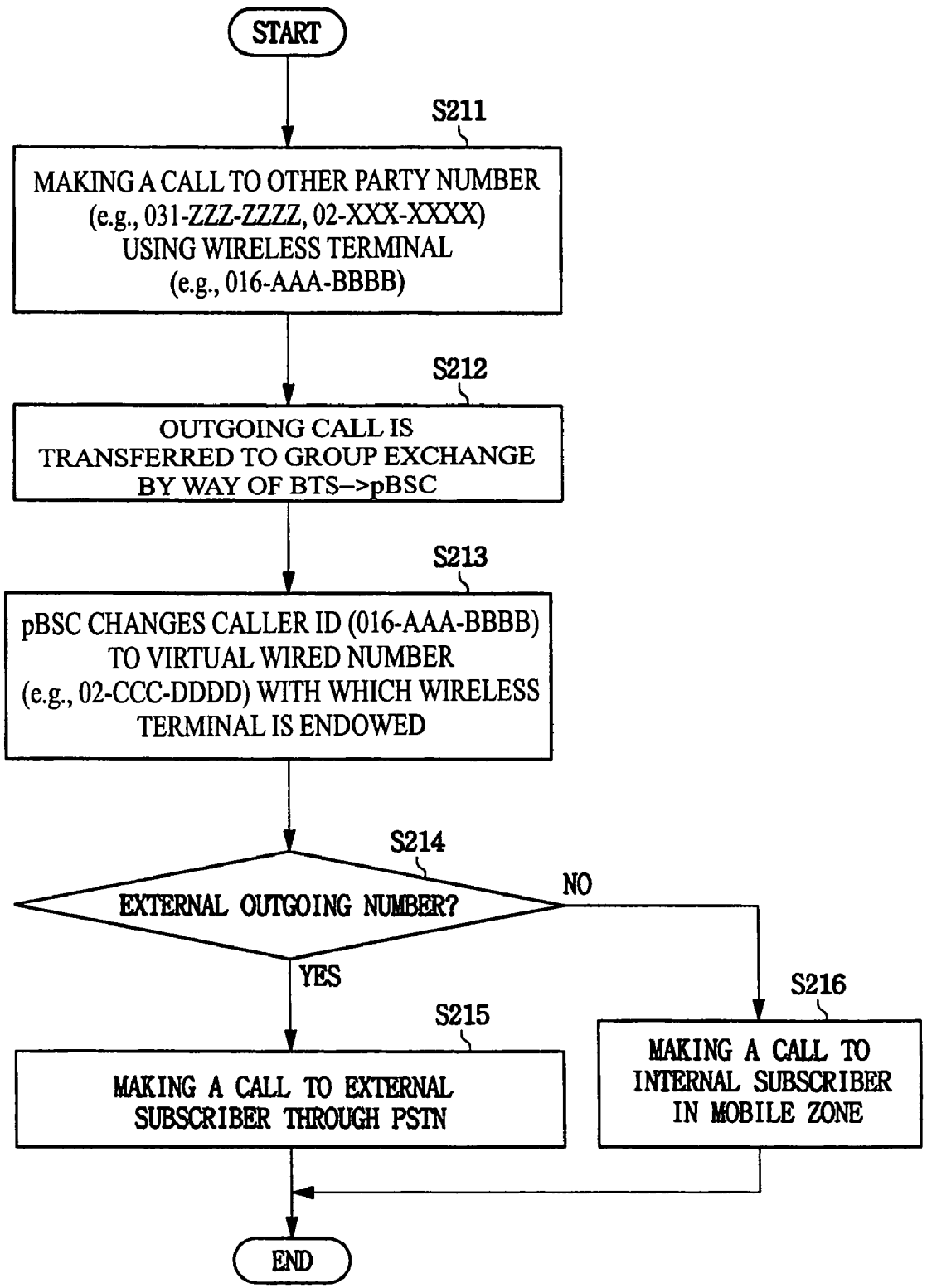
FIG. 25 is a flow chart in which the wireless terminal subscriber makes a call to the external subscriber or internal subscriber in FIGS. 23 and 24.

FIG. 23 is a diagram showing a process in which a wireless terminal subscriber makes a call to an external subscriber, FIG. 24 is a diagram showing a process in which a wireless terminal subscriber makes a call to an internal subscriber, and FIG. 25 is a flow chart in which a wireless terminal subscriber makes a call to an external subscriber or an internal subscriber.

With reference to a terminating path (P16) of FIG. 23 and a terminating path (P17) of FIG. 24, a terminating process of FIG. 25 is explained.

The wireless terminal 220 (for example, 016-AAA-BBBB) makes a call to the other party's number (for example, 031-ZZZ-ZZZZ, or 02-XXX-XXXX) (S211). An outgoing call generated in the wireless terminal 220 is transferred to the group exchange 131 through the pBTS 210 and pBSC 132 (S212).

At this time, the pBSC 132 changes a caller ID (016-AAA-BBBB) with which the wireless terminal is endowed to the virtual wired number (for example, 02-CCC-DDDD) (S213). Here, the change of the caller ID is performed with reference to the database 132*b* of FIG. 5.

The group exchange 131 determines whether the outgoing number sent out from the wireless terminal is an external outgoing number or not (S214). In the case that it is the external outgoing number, the group exchange 131 makes a call to an external subscriber of the corresponding phone number through the PSTN 10 (P16)(S215).

On the other hand, in the case that it is determined that the outgoing number is not the external outgoing number when the group exchange 131 determines whether the outgoing number sent out from the wireless terminal is the external outgoing number or not, the internal subscribers 220, 240 and 260 in the mobile zone 200 are called (P17)(S216).

At this time, an accounting process can be performed through accounting equipment (not shown) connected to the group exchange 131. Here, a speech between the internal subscribers performed in the wired and wireless interconnecting apparatus 100 within the mobile zone 200 is not specially charged and can be freely operated. In such a case, the subscribers can make a speech with one another without charging for the speech.

Figure 26:
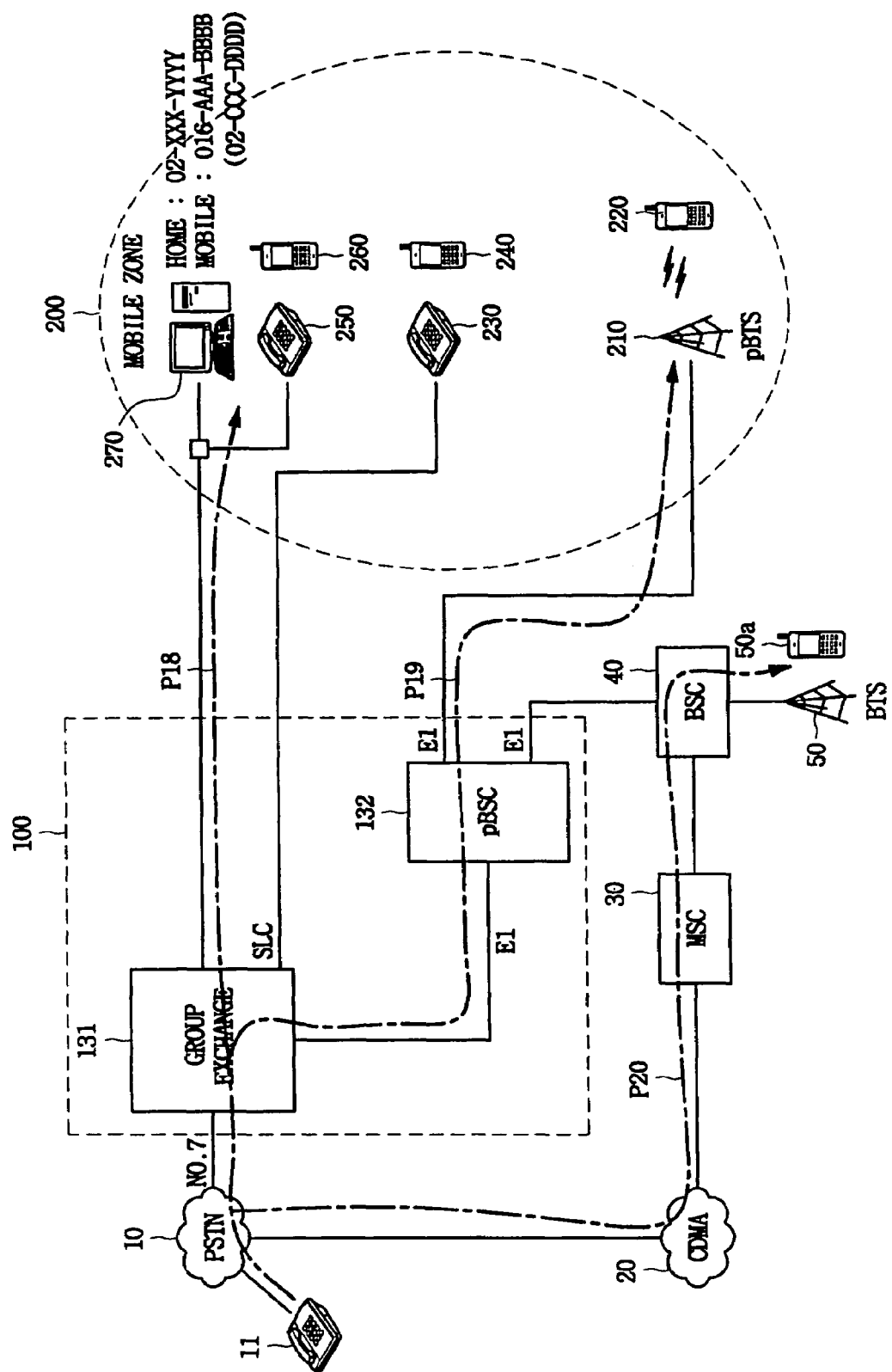
FIG. 26 is a network flow chart showing a process in which an incoming call is re-routed when a mobile zone has nothing.
Figure 27:
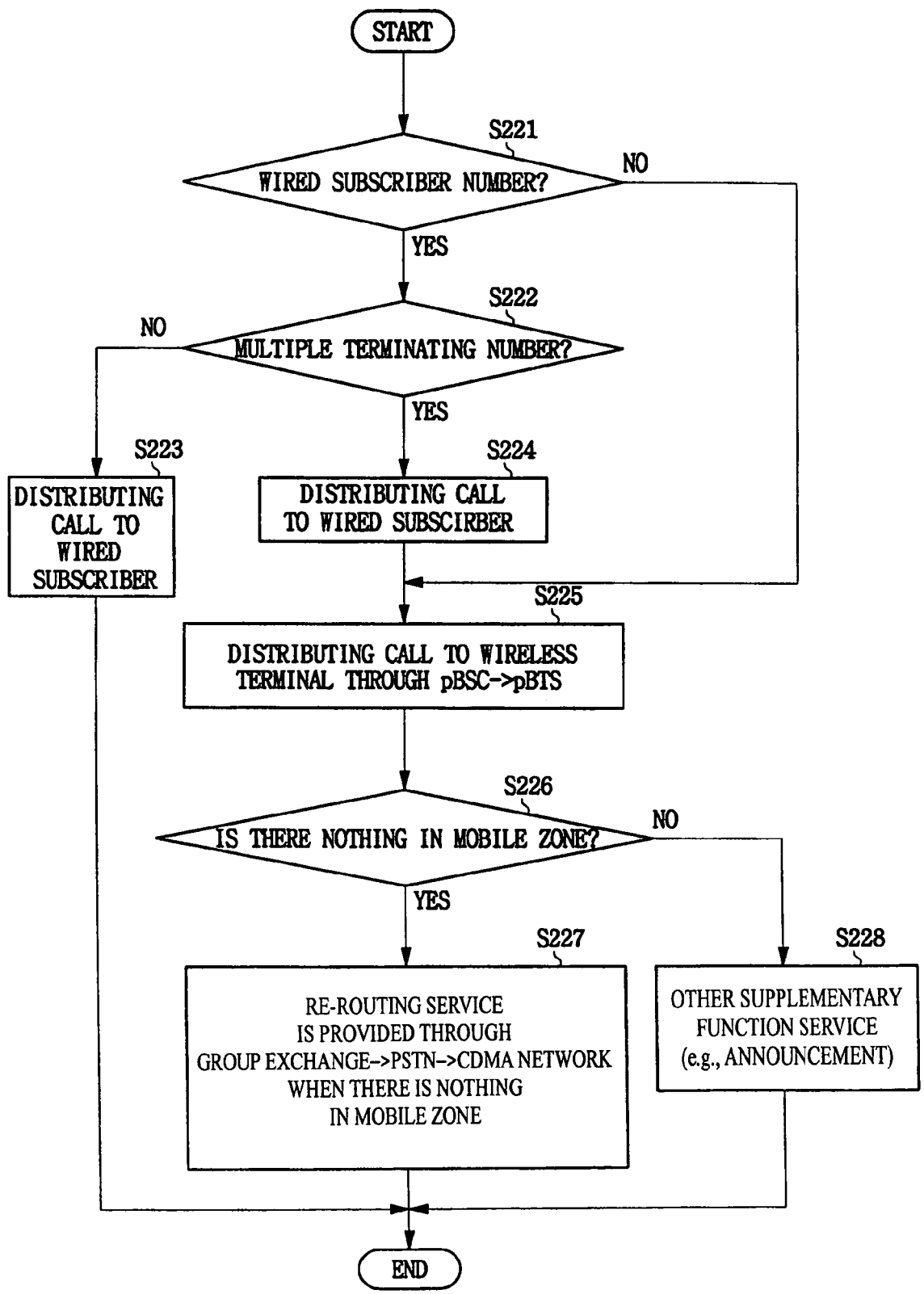
FIG. 27 is a flow chart showing a process in which the incoming call is re-routed when the mobile zone has nothing in FIG. 26.

FIGS. 26 and 27 are diagrams showing a process in which an incoming call is re-routed when the mobile zone has nothing.

The re-routing process of FIG. 27 will be explained with reference to the terminating paths (P18, P19 and P20) of FIG. 26.

In the case that an arbitrary subscriber terminal 11 makes a call to an arbitrary wired phone number through the PSTN 10, the group exchange 131 receives the corresponding wired phone number through the PSTN 10 and analyzes the called phone number. At this time, the group exchange 131 determines whether the corresponding wired phone number is the wired subscriber number or not (S221). As a result of the determination, in the case of the wired subscriber number, the group exchange 131 determines whether its corresponding phone number in the database 131*b* as shown in FIG. 4 is a multiple terminating number (S222). As a result of the determination of S222, in the case that the corresponding phone number is not the multiple terminating number, the call is distributed to the wired subscriber (S223). However, as a result of the determination of S222, in the case that the corresponding phone number is the multiple terminating number, the call is distributed to the wired subscriber at first (P18)(S224). Next, the group exchange 131 requests a virtual number to the pBSC 132, and a virtual number for the corresponding wired phone number is provided from the pBSC 132 and the call is distributed to the corresponding wireless terminal 220 through the pBSC 132 and pBTS 210 (P19)(S225). On the other hand, when it is determined whether the corresponding phone number is the wired subscriber number (S221), in the case of not being the wired subscriber number as a result of the determination, the call is distributed to the corresponding wireless terminal through the pBSC 132 and pBTS 210.

Next, in the case that at least one of the wired terminal 250 and the wireless terminal 220 makes a response in the mobile zone 200, the call is processed according to the response, and it is, otherwise, determined whether there exists the subscriber in the mobile zone 200 (S226). In the case that there exists nothing in the mobile zone 200 as the response of the wired terminal or wireless terminal does not exist in the mobile zone 200 and there is no subscriber in the mobile zone 200, the group exchange 131 makes a call to the wireless terminal 50*a* in the public mobile communication network through the BTS 50 existing in the public mobile communication network by way of the PSTN 10 and CDMA network 20 (S227). In the case that there is no response even when the subscriber exists in the mobile zone 200, a voice information message such as "Please call again since the subscriber is not available now" may be transmitted (S228).

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 28:
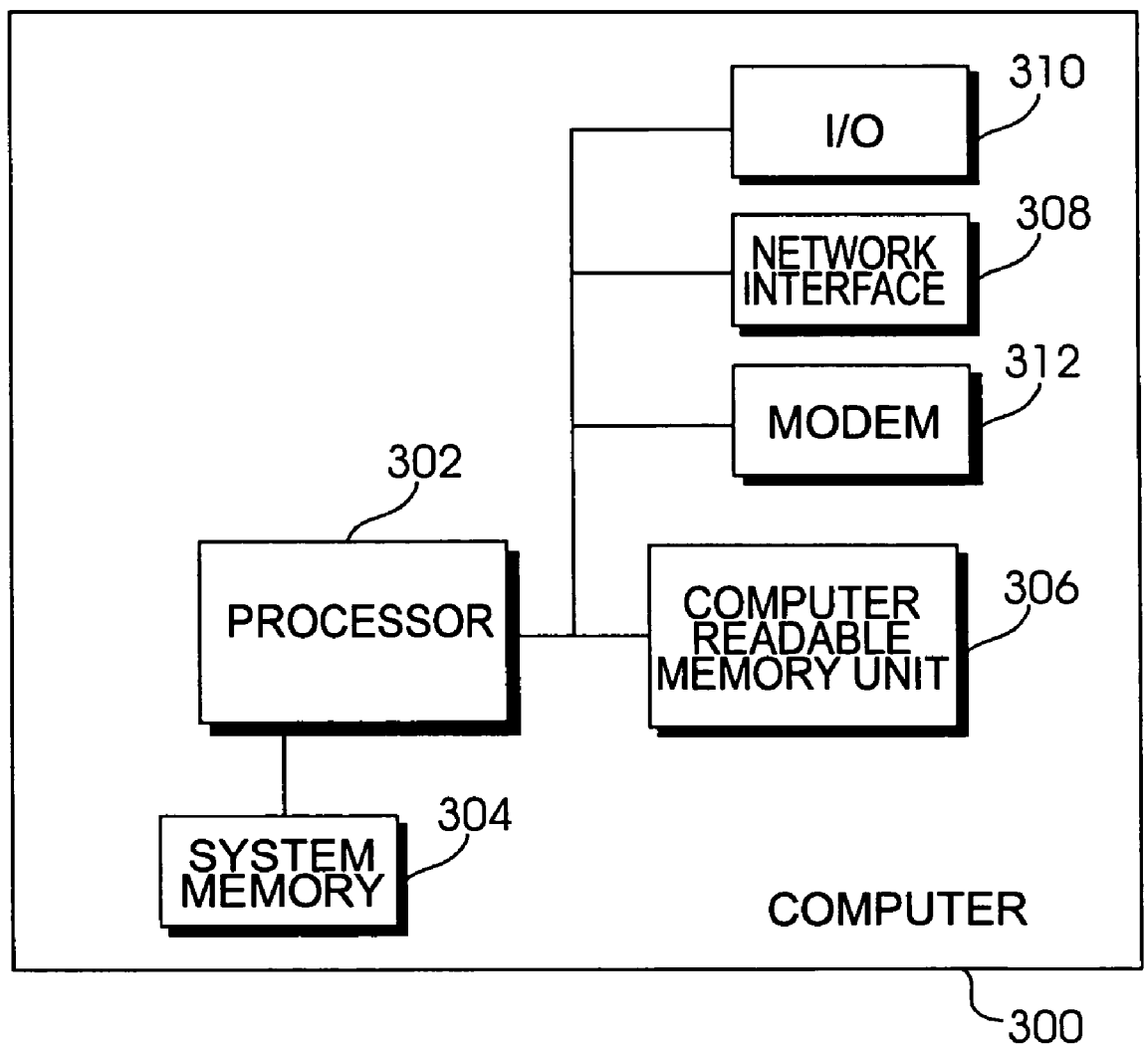
FIG. 28 shows an example of a computer including a computer-readable medium having computer-executable instructions for performing a technique of the present invention.

An example of a computer, but not limited to this example of the computer, that can read computer readable media that includes computer-executable instructions of the present invention is shown in FIG. 28. The computer 300 includes a processor 302 that controls the computer 300. The processor 302 uses the system memory 304 and a computer readable memory device 306 that includes certain computer readable recording media. A system bus connects the processor 302 to a network interface 308, modem 312 or other interface that accommodates a connection to another computer or network such as the Internet. The system bus may also include an input and output interface 310 that accommodates connection to a variety of other devices.

EFFECT

According to the present invention, in the case that a subscriber is subscribed in a wired phone service using a wired and wireless interconnecting apparatus, there is provided portability in the wired phone service wherein, when the wired phone terminal is called, the call can be simultaneously terminated in a private mobile communication network operated by a wired and wireless interconnecting apparatus through an existing wired phone service and an assigned wireless terminal.

Also, as a virtual wired phone number in a form of a general wired phone service phone number is operated, it is possible to receive an telephone called by an external subscriber using a wired phone number through a user's wireless terminal, and as a caller ID is transmitted as a virtual wired phone number when the external subscriber is called, an effect can be obtained that the user has a wired phone terminal in view of the external subscriber on the state that the wired phone terminal is not installed. Moreover, when the external subscriber makes a call to a subscriber's wireless terminal, the phone service can be provided according to an accounting rate of the wired phone service.

Also, even when a subscriber simultaneously uses the wired phone and wireless phone services, an internal subscriber may not be charged so that a burden due to a dual charge can be reduced.

What is claimed is:

1. A system for operating wired and wireless phone services interconnectively, the system comprising:
   a wired exchange connected to a public switched telephone network (PSTN), for providing a wired phone service;
   a mobile gateway connected to the wired exchange for assigning virtual wired phone numbers to a plurality of mobile communication terminals, for providing a public wired phone service to the mobile communication terminals by linking the virtual wired phone numbers with mobile identifier numbers (MINs) of the mobile communication terminals, and for distributing a call to a wired terminal and then to a wireless terminal when it is determined that a phone number received from the wired exchange is a simultaneously called phone number; and
   a private base station controller (pBSC) connected to the mobile gateway and a public land mobile network (PLMN) for providing a mobile communication service to the mobile communication terminals through a private base station transceiver system (pBTS);
   wherein the pBSC comprises a database for storing the virtual wired phone number assigned to each of the mobile communication terminals and the MIN of the mobile communication terminal corresponding to the virtual wired phone number.

2. The system according to claim 1, wherein the mobile gateway calls a mobile communication terminal corresponding to the virtual wired phone number when receiving an incoming call containing the virtual wired phone number through the wired exchange.

3. The system according to claim 1, wherein the mobile gateway comprises a database for storing, for each arbitrary wired phone number, information indicating whether or not each of the wired phone numbers is a virtual phone number and information about whether or not a multiple terminating service is registered.

4. The system according to claim 3, wherein the mobile gateway simultaneously calls a wired terminal corresponding to the wired phone number and the mobile communication terminal when the wired phone number is registered with the multiple terminating service and is called.

5. The system according to claim 1, wherein, when receiving a request for an outgoing service from an internal mobile communication terminal, the mobile gateway changes caller identification (CID) to the virtual wired phone number assigned to the internal mobile communication terminal, and calls a called terminal via the PSTN.

6. A system for operating wired and wireless phone services interconnectively, the system comprising:
   a wired exchange connected to a public switched telephone network (PSTN), for providing a wired phone service;
   a mobile gateway connected to the wired exchange for assigning virtual wired phone numbers to a plurality of mobile communication terminals, for providing a public wired phone service to the mobile communication terminals by linking the virtual wired phone numbers with mobile identifier numbers (MINs) of the mobile communication terminals, and for distributing a call to a wired terminal and then to a wireless terminal when it is determined that a phone number received from the wired exchange is a simultaneously called phone number; and a private base station controller (pBSC) connected to the mobile gateway and a public land mobile network (PLMN) for providing a mobile communication service to the mobile communication terminals through a private base station Transceiver system (pBTS);

wherein the mobile gateway assigns an extension subscriber line card (SLC) of a wired phone connected to a trunk thereof with the SLC thereof, and connects the assigned extension SLC to a plurality of wired terminals.

7. A method for operating wired and wireless phone services interconnectively, the method comprising the steps of:

assigning, by a mobile gateway, virtual wired phone numbers to a plurality of mobile communication terminals;

providing, by the mobile gateway, a public wired phone service to the mobile communication terminals by linking the virtual wired phone numbers with mobile identifier numbers (MINs) of the mobile communication terminals;

determining whether a called phone number received by a wired exchange is a wired subscriber phone number when a subscriber terminal calls a wired phone number;

analyzing, by the mobile gateway, the phone number received from the wired exchange to determine whether the phone number is a simultaneously called phone number;

distributing, by the mobile gateway, the call to a wired terminal and then to a wireless terminal when it is determined that the phone number is the simultaneously called phone number; and storing, in a database of a private base station controller (pBSC), the virtual wired phone number assigned to each of the mobile communication terminals and the MIN of the mobile communication terminal corresponding to the virtual wired phone number.

8. The method according to claim 7, wherein in the step of providing the public wired phone service, when a called number containing an incoming call received through a wired exchange is a virtual wired phone number, the mobile gateway transmits the incoming call to the mobile communication terminal corresponding to the virtual wired phone number.

9. The method according to claim 7, further comprising the step of providing the mobile gateway with a database for storing, for each arbitrary wired phone number, information indicating whether or not each of the wired phone numbers is a virtual phone number and information about whether or not a multiple terminating service is registered.

10. The method according to claim 9, further comprising the step of simultaneously calling, by the mobile gateway, a wired terminal corresponding to the wired phone number and the mobile communication terminal when the wired phone number registered with the multiple terminating service is called.

11. The method according to claim 10, further comprising the step of rerouting, by the mobile gateway, an incoming call to one of a public switched telephone network (PSTN) and a public land mobile network (PLMN) when the called wired terminal and the mobile communication terminal make no response.

12. The method according to claim 7, further comprising the step of, when the mobile gateway receives a request for an outgoing service from an internal mobile communication terminal, changing, by the mobile gateway, a caller identification (CID) to the virtual wired phone number assigned to the internal mobile communication terminal, and calling a called terminal via the public switched telephone network (PSTN).

13. The method according to claim 12, further comprising the step of performing, by billing equipment existing at a central office of the PSTN, billing of communication between the internal mobile communication terminal and a called external terminal.

14. The method according to claim 12, further comprising the step of performing, by the mobile gateway, billing of communication between the internal mobile communication terminal and a called extension subscriber terminal.

15. A method for operating wired and wireless phone services interconnectively, the method comprising the steps of:

assigning, by a mobile gateway, virtual wired phone numbers to a plurality of mobile communication terminals;

providing, by the mobile gateway, a public wired phone service to the mobile communication terminals by linking the virtual wired phone numbers with mobile identifier numbers (MINs) of the mobile communication terminals;

determining whether a called phone number received by a wired exchange is a wired subscriber phone number when a subscriber terminal calls a wired phone number;

analyzing, by the mobile gateway, the phone number received from the wired exchange to determine whether the phone number is a simultaneously called phone number;

distributing, by the mobile gateway, the call to a wired terminal and then to a wireless terminal when it is determined that the phone number is the simultaneously called phone number; and assigning, by the mobile gateway, an extension number subscriber line card (SLC) of a wired phone connected to a trunk thereof with the SLC thereof, and connecting the assigned extension SLC to a plurality of wired terminals.

* * * * *